United States Patent
Ikawa et al.

(10) Patent No.: US 12,555,643 B2
(45) Date of Patent: Feb. 17, 2026

(54) DUMMY MEMORY HOLE DEFECT DETECTION

(71) Applicant: Sandisk Technologies, Inc., Milpitas, CA (US)

(72) Inventors: Yusuke Ikawa, Yokohama (JP); Xiaolong Hu, Yokkaichi (JP); Kei Samura, Yokohama (JP)

(73) Assignee: Sandisk Technologies, Inc., Milpitas, CA (US)

( * ) Notice: Subject to any disclaimer, the term of this patent is extended or adjusted under 35 U.S.C. 154(b) by 41 days.

(21) Appl. No.: 18/635,219

(22) Filed: Apr. 15, 2024

(65) Prior Publication Data

US 2025/0322897 A1   Oct. 16, 2025

(51) Int. Cl.
*G11C 29/12*  (2006.01)
*G11C 29/02*  (2006.01)

(52) U.S. Cl.
CPC ...... *G11C 29/12005* (2013.01); *G11C 29/022* (2013.01); *G11C 29/1201* (2013.01)

(58) Field of Classification Search
CPC ............ G11C 29/12005; G11C 29/022; G11C 29/1201
See application file for complete search history.

(56) References Cited

U.S. PATENT DOCUMENTS

| | | |
|---|---|---|
| 9,887,207 B2 | 2/2018 | Zhang et al. |
| 10,886,002 B1 | 1/2021 | Linnen et al. |
| 11,545,226 B1 | 1/2023 | Prakash et al. |
| RE49,440 E | 2/2023 | Lee |
| 11,581,049 B2 | 2/2023 | Isozumi et al. |
| 2003/0223269 A1* | 12/2003 | Hidaka ............... G11C 29/804  365/171 |
| 2009/0168532 A1 | 7/2009 | Sel et al. |
| 2009/0279356 A1 | 11/2009 | Hashimoto et al. |
| 2015/0194435 A1 | 7/2015 | Lee |
| 2016/0012916 A1 | 1/2016 | Hara et al. |
| 2017/0084342 A1 | 3/2017 | Yang et al. |
| 2019/0252029 A1* | 8/2019 | Lai ....................... G11C 16/16 |
| 2022/0310161 A1 | 9/2022 | Pachamuthu et al. |
| 2024/0023333 A1 | 1/2024 | Wei et al. |
| 2024/0203509 A1* | 6/2024 | Kim .................... G11C 16/26 |
| 2024/0321363 A1* | 9/2024 | Tachi .................... H10B 43/10 |

FOREIGN PATENT DOCUMENTS

CN    112635481 A    4/2021

OTHER PUBLICATIONS

International Search Report & The Written Opinion of the International Searching Authority dated Jun. 9, 2025, International Application No. PCT/US2025/011255.

* cited by examiner

*Primary Examiner* — Mohammed A Bashar
(74) *Attorney, Agent, or Firm* — Pearl Cohen Zedek Latzer Baratz LLP

(57) ABSTRACT

Technology for detection of defects in dummy memory holes in a 3D NAND memory structure. Dummy bit lines connected to dummy memory holes are used to detect defects associated with the dummy memory holes. A system may perform a stress test in which a stress voltage is applied to one or more word lines while another voltage (e.g., 0V) is applied to the dummy bit lines. The system may detect defects associated with the dummy memory holes by sensing the dummy bit lines. The dummy bit lines may be electrically connected with each other which reduces the amount of circuitry for providing a voltage to the dummy bit lines and/or sensing the dummy bit lines.

20 Claims, 20 Drawing Sheets

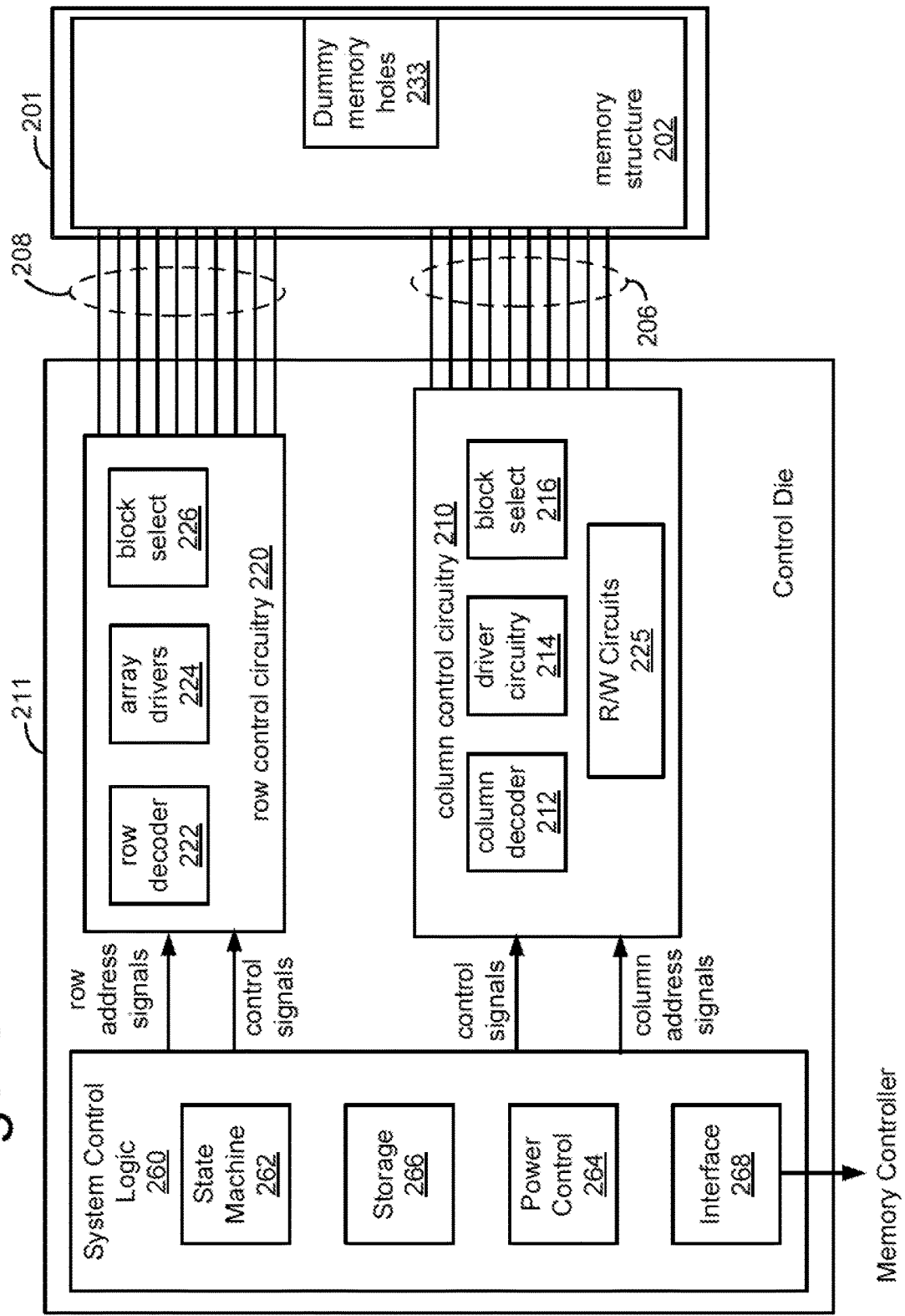

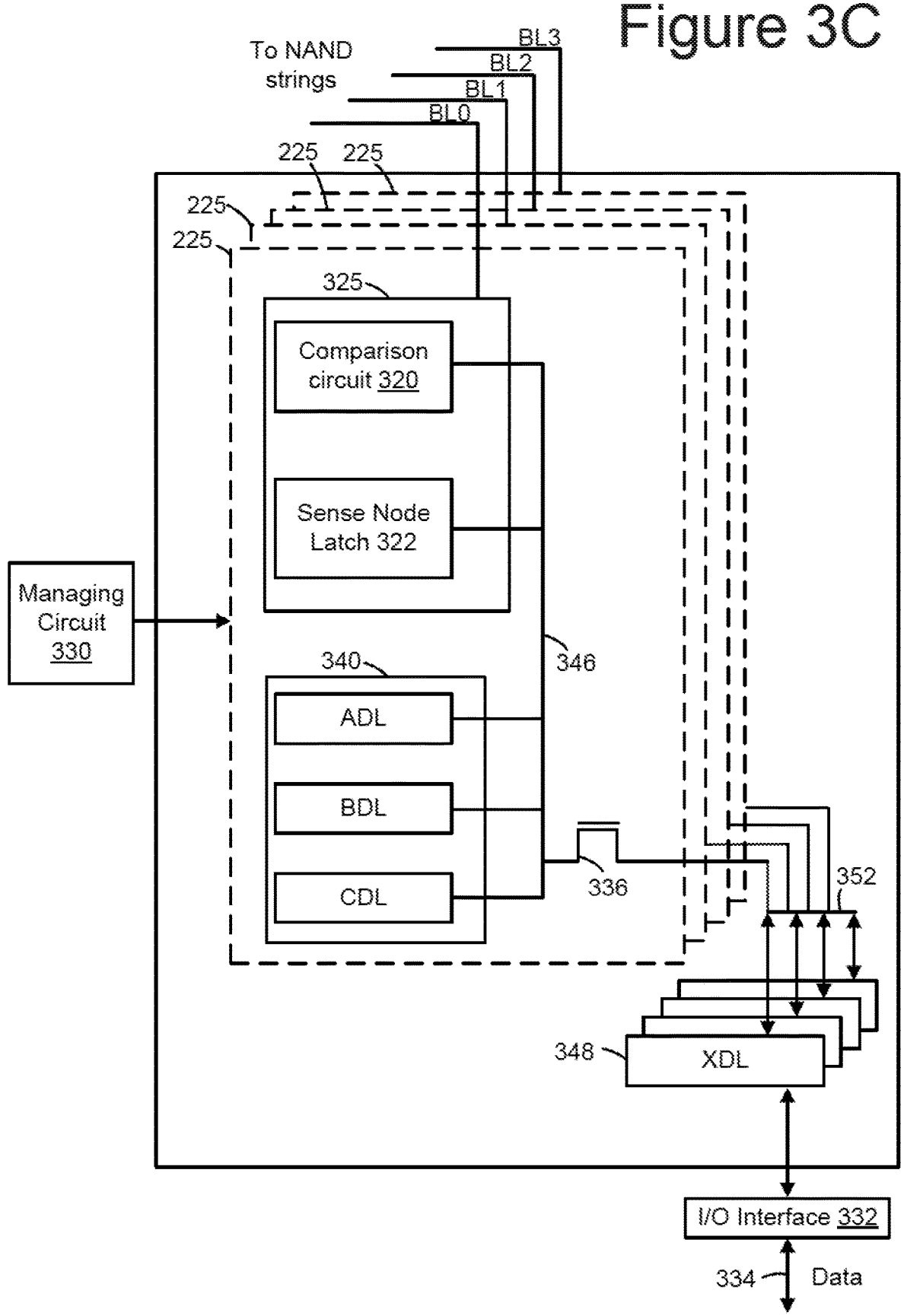

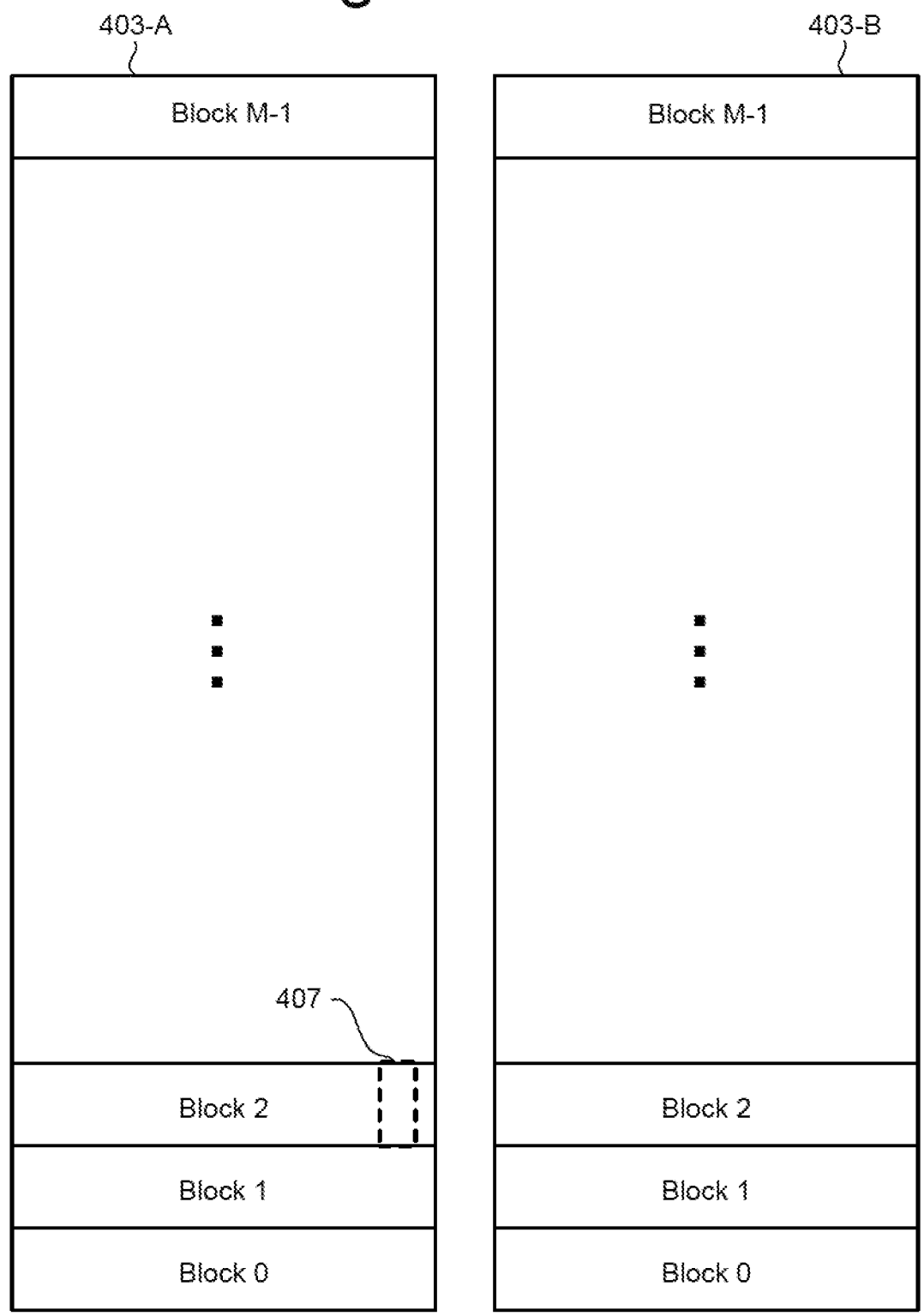

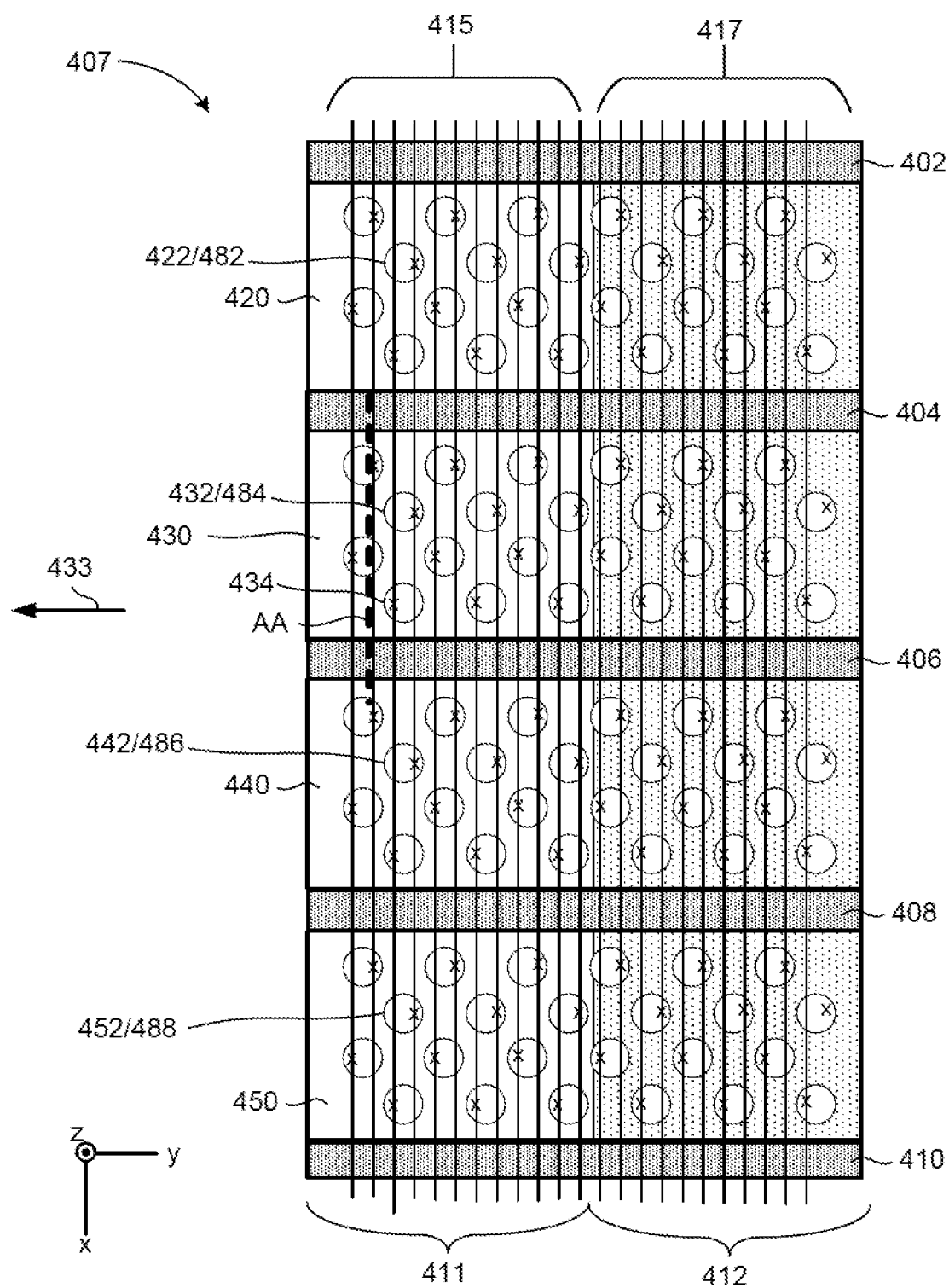
Figure 4B1

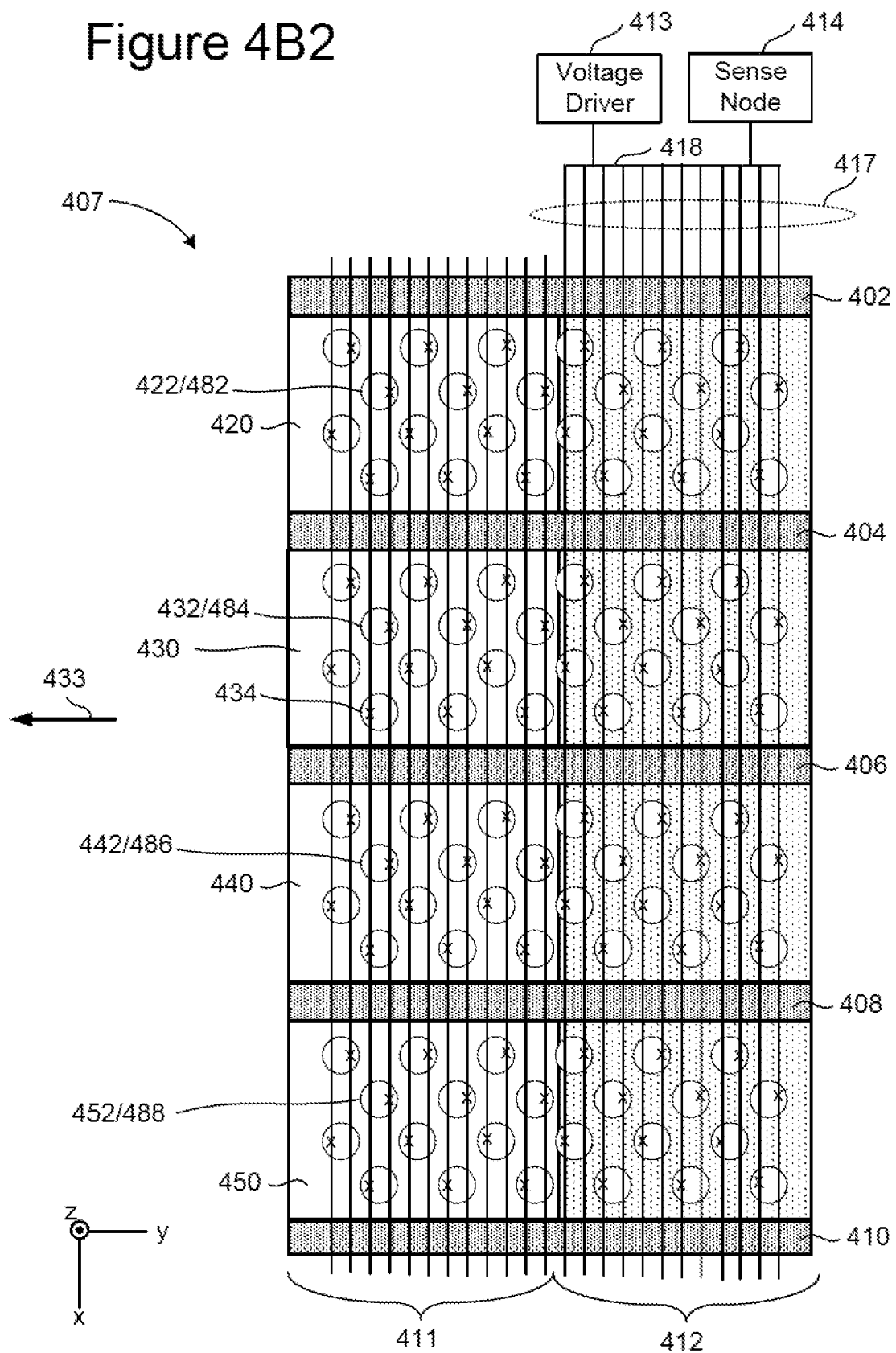
Figure 4B2

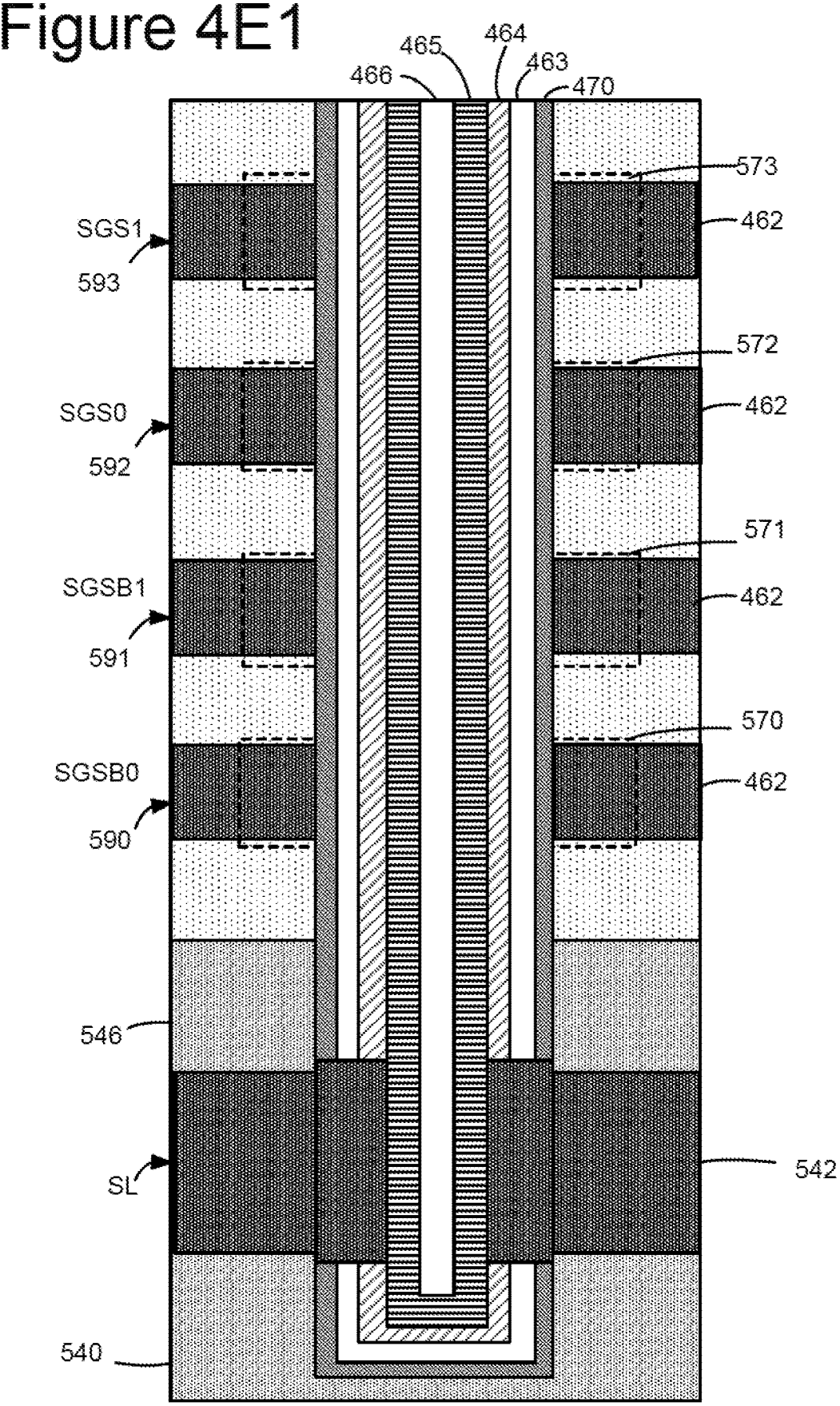
Figure 4E1

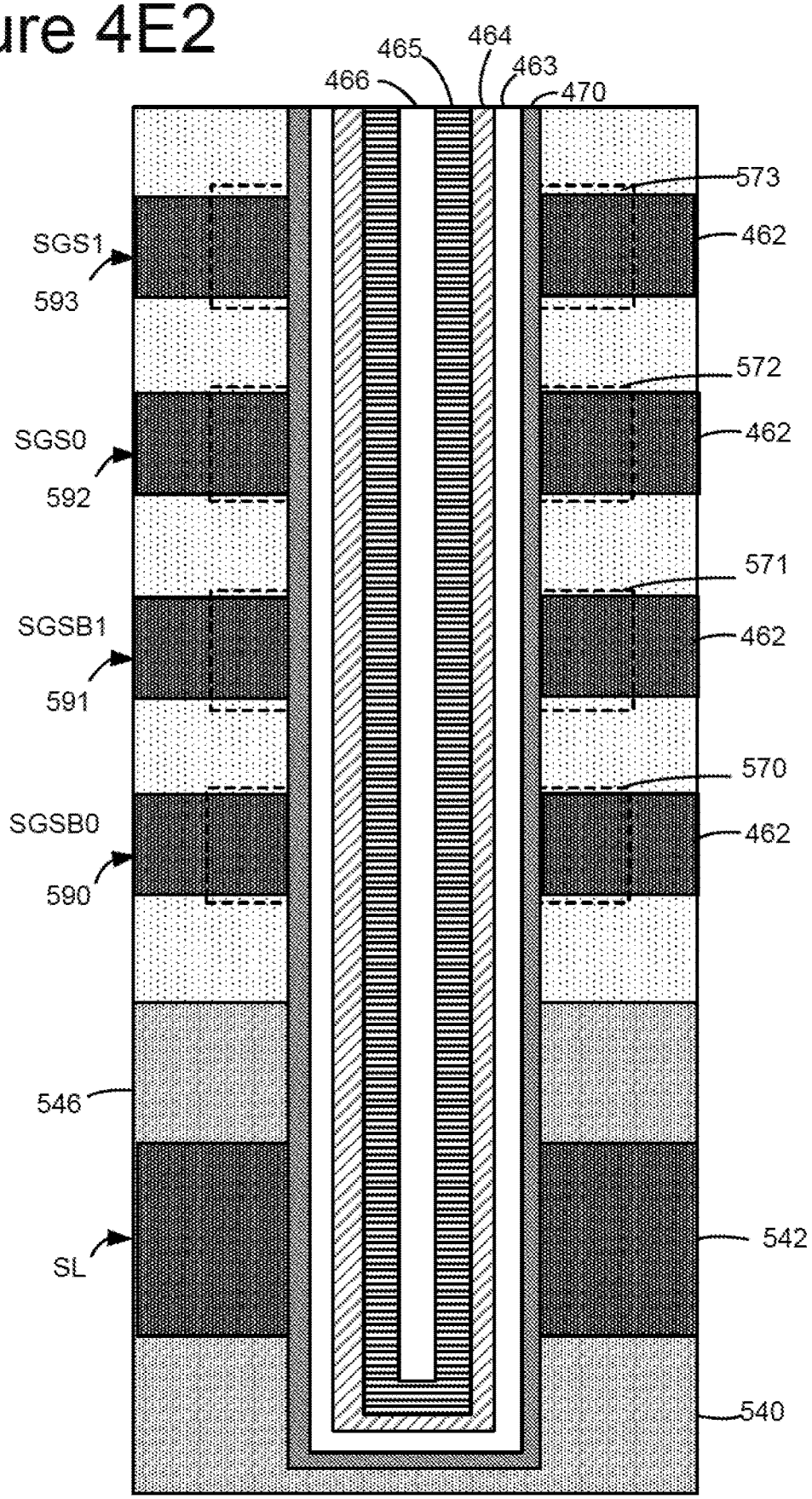
Figure 4E2

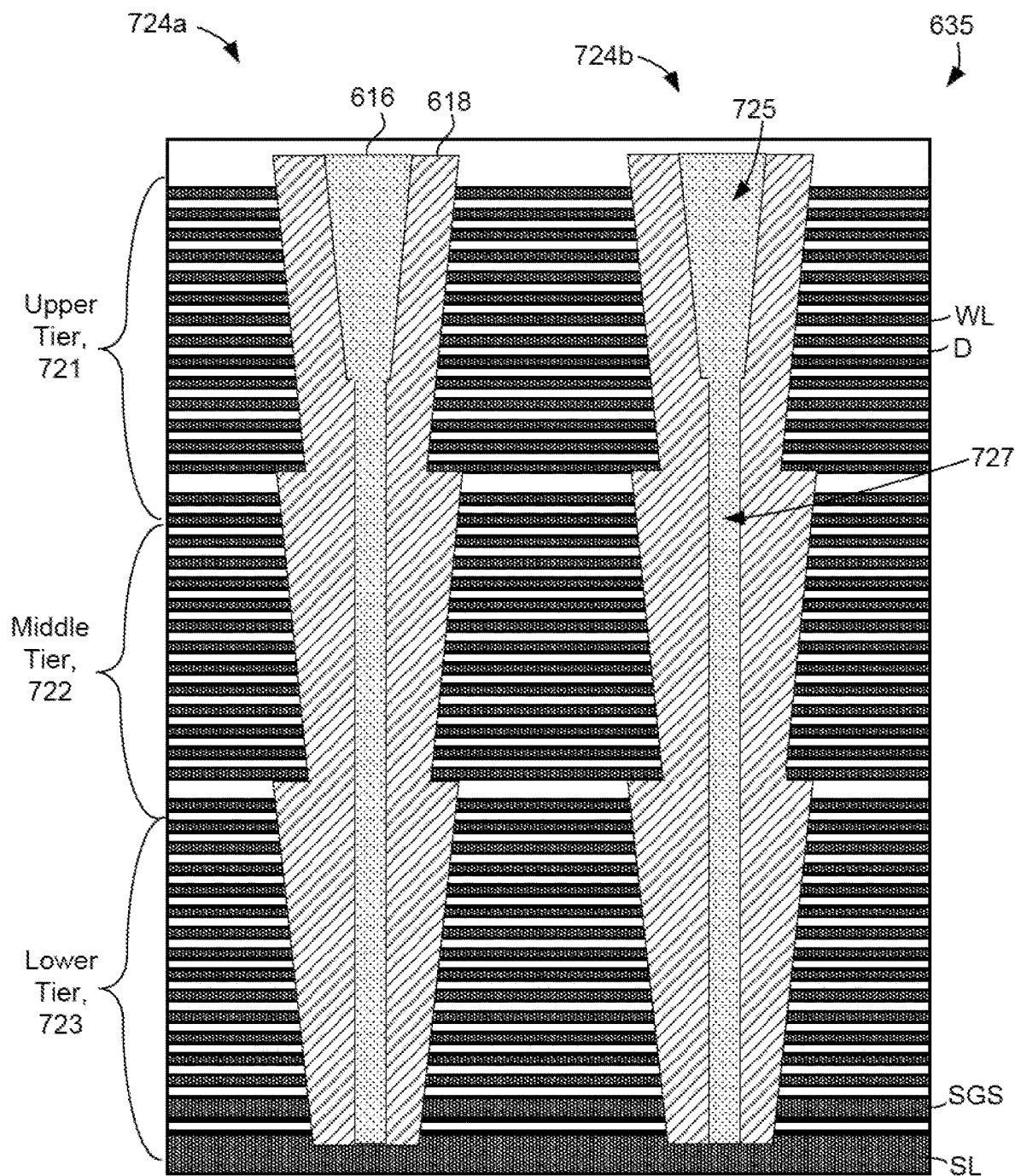
Figure 6B1

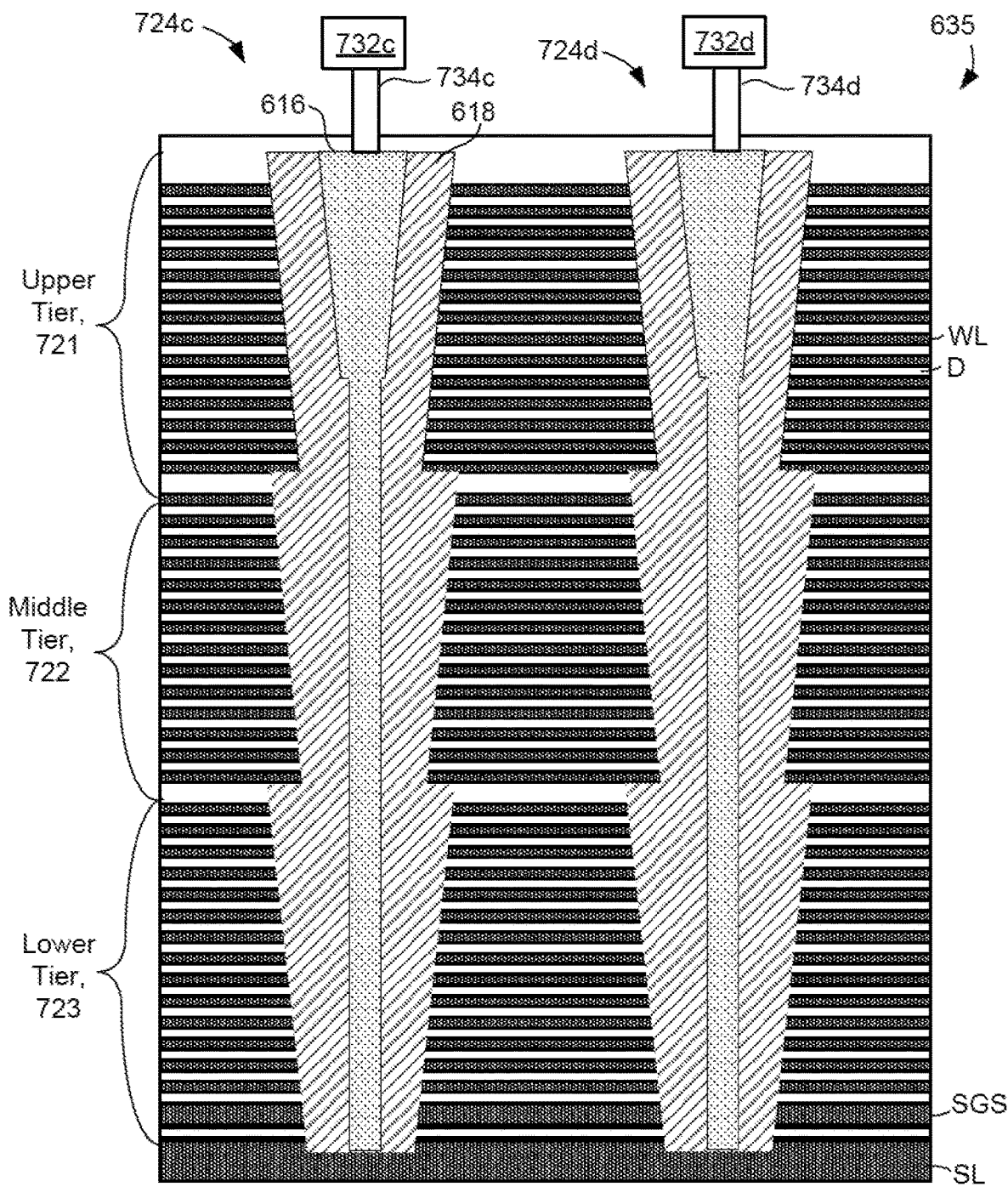
Figure 6B2

DUMMY MEMORY HOLE DEFECT DETECTION

BACKGROUND

The present disclosure relates to technology for non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. Herein, a memory system that uses non-volatile memory for storage may be referred to as a storage system. The memory structure may be three-dimensional (3D). One type of 3D structure has non-volatile memory cells arranged as vertical NAND strings. The 3D memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the physical block.

One type of three-dimensional memory structure has alternating dielectric layers and conductive layers in a stack. NAND strings are formed vertically in the alternating dielectric layers and conductive layers in what may be referred to as memory holes. For example, after memory holes are drilled into the stack of alternating dielectric layers and conductive layers, the memory holes are filled in with layers of materials to create a vertical column of memory cells (e.g., NAND string). These layers may include one or more layers for a tunnel dielectric, a charge-trapping material, and a channel (or body).

Typically not all of the memory holes contain NAND strings that are intended for use to store data. In some fabrication techniques, memory holes at an edge of a block are referred to as dummy memory holes. Some of the dummy memory holes may contain the same or similar layers of materials that are used to form the NAND strings that are eligible to store data. However, the dummy memory holes are not eligible to store data.

The semiconductor fabrication process for forming a 3D memory structure may result in defects. A defect may create an electrical short that can impair proper operation of a region of the 3D NAND memory structure. For example, there could be an electrical short between one of the conductive layers and a conductive region in a dummy memory hole. Even if such defects occur with respect to a dummy memory hole proper operation of the NAND may be impacted. However, detection of defects associated with the dummy memory holes is especially challenging.

BRIEF DESCRIPTION OF THE DRAWINGS

Like-numbered elements refer to common components in the different figures.

FIG. 2B is a block diagram of one embodiment of an integrated memory assembly.

FIG. 3C is a block diagram depicting one embodiment of a portion of column control circuitry that contains a number of read/write circuits.

FIG. 4A is a block diagram of one embodiment of a memory structure having two planes.

FIG. 4B 1 is a block diagram depicting a top view of a portion of block of memory cells showing an array region and an embodiment of a dummy array region.

FIG. 4B2 is a block diagram depicting a top view of a portion of block of memory cells showing an array region and an embodiment of a dummy array region in which dummy bit lines are electrically connected to each other.

FIG. 4E1 depicts a view of the region 447 of FIG. 4C.

FIG. 4E2 depicts the source end of an embodiment of a dummy memory hole.

FIG. 6B1 is a stack showing a cross-sectional view along line CC of FIG. 5.

FIG. 6B2 is a stack showing a cross-sectional view of an embodiment along line CC of FIG. 5.

DETAILED DESCRIPTION

Technology is disclosed for detection of defects in dummy memory holes in a 3D NAND memory structure. The dummy memory holes may be dummy NAND strings that are not eligible to store data. The dummy NAND strings may contain the same memory cell films that are present in regular NAND strings used for data storage. However, defect detection can also be performed for dummy memory holes that are not dummy NAND strings. Detecting defects in dummy memory holes can be especially challenging because dummy memory holes are not used for data storage and therefore may not have associated circuitry such as sense amplifiers. Also, some conventional dummy memory holes are electrically floating, which makes defect detection a greater challenge.

In an embodiment, dummy bit lines connected to dummy memory holes are used to detect defects associated with the dummy memory holes. An embodiment includes a system that performs a stress test in which a stress voltage is applied to one or more word lines while another voltage (e.g., 0V)

is applied to the dummy bit lines. A stress voltage is a voltage having a sufficient magnitude to accelerate a defect including, but not limited to, an electrical short. An embodiment includes a system that performs defect detection by sensing the dummy bit lines. In an embodiment dummy bit lines are electrically connected with each other which reduces the amount of circuitry for providing a voltage to the dummy bit lines and/or sensing the dummy bit lines.

Figure 1:
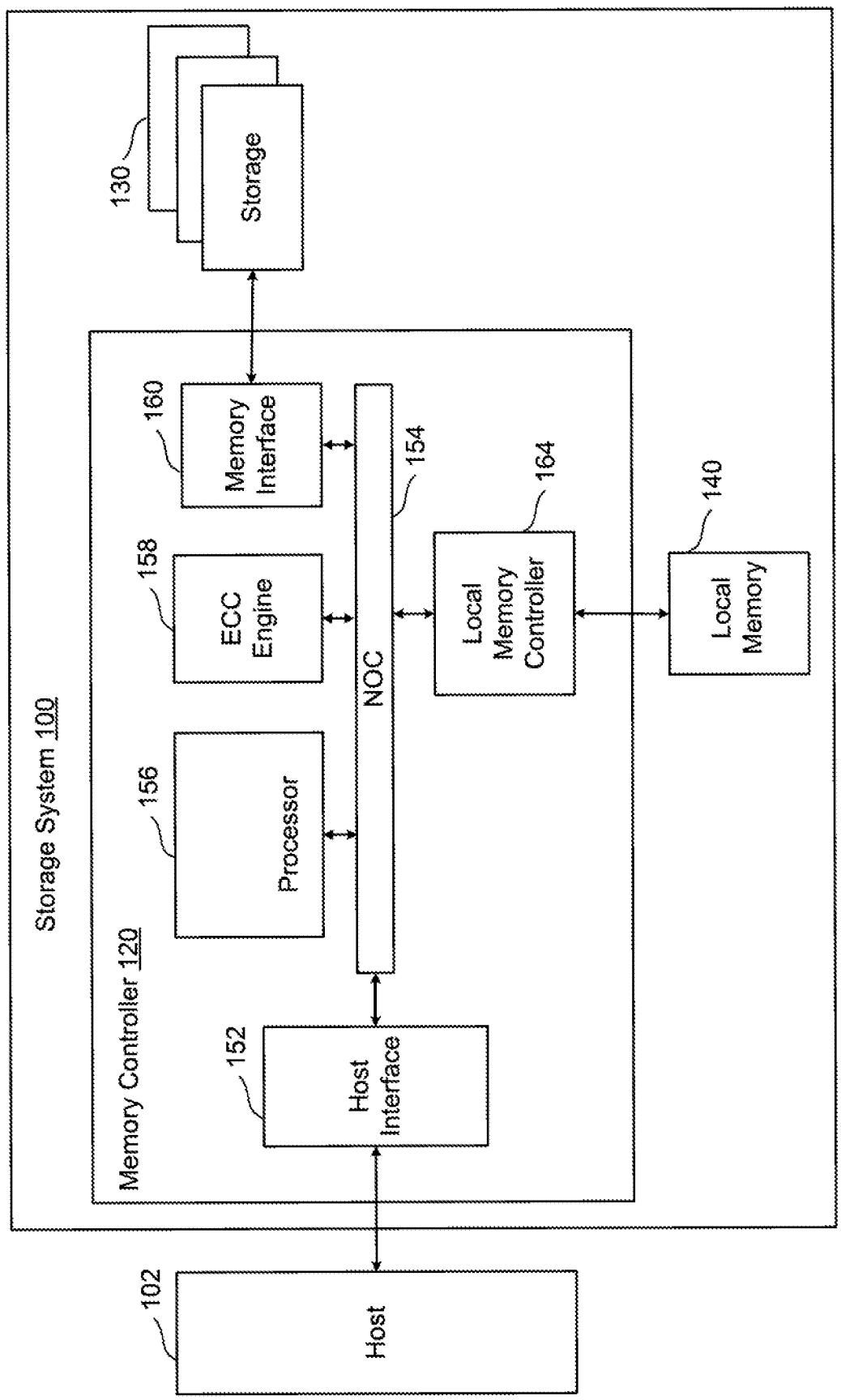
FIG. 1 is a block diagram depicting one embodiment of a memory system.

FIG. 1 is a block diagram of one embodiment of a memory system 100 that implements the technology described herein. In one embodiment, memory system 100 is a solid state drive ("SSD"). Memory system 100 can also be a memory card, USB drive or other type of memory system. The proposed technology is not limited to any one type of memory system. Memory system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, memory system 100. In other embodiments, memory system 100 is embedded within host 102.

The components of memory system 100 depicted in FIG. 1 are electrical circuits. Memory system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations such as programming, erasing, reading, and memory management processes. In one embodiment, processor 156 is programmed by firmware. In other embodiments, processor 156 is a custom and dedicated hardware circuit without any software. Processor 156 may also implement a translation module, as a software/firmware process or as a dedicated hardware circuit. In many systems, the non-volatile memory is addressed internally to the memory system using physical addresses associated with the one or more memory die. However, the host system will use logical addresses to address the various memory locations. This enables the host to assign data to consecutive logical addresses, while the memory system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a memory system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
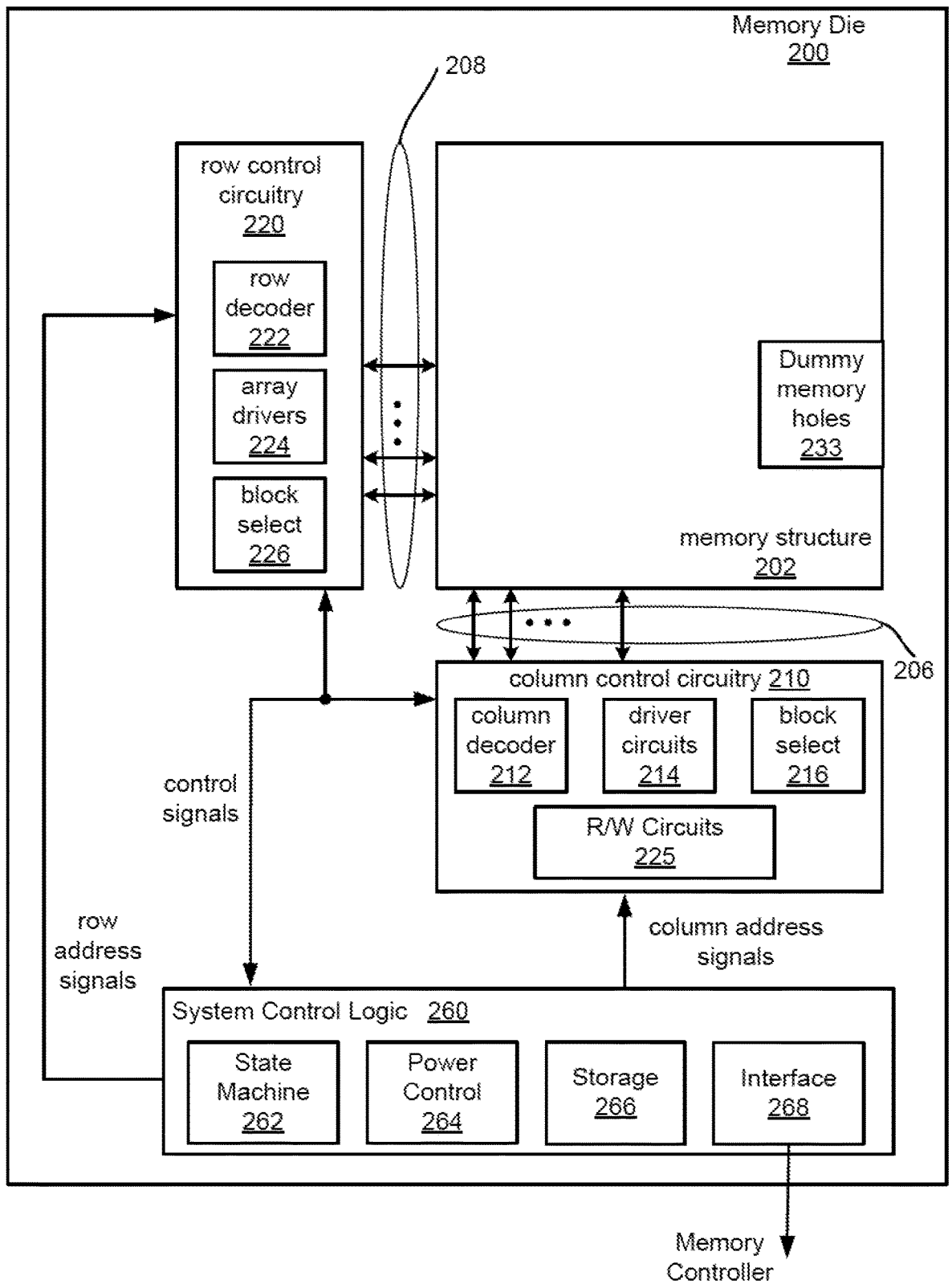
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. In an embodiment, the memory structure 202 contains dummy memory holes 233. In an embodiment, circuitry on the memory die 200 applies a stress voltage to the dummy memory holes 233 and tests whether there is a defect associated with the dummy memory holes 233.

The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers. The system control logic 260, column control circuitry 210, and/or row control circuitry 220 are configured to control memory operations such as open block reads at the die level.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe-Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of memory system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the memory system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of memory system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together. In an embodiment, circuitry on the control die 211 applies a stress voltage to the dummy memory holes 233 and tests whether there is a defect associated with the dummy memory holes 233.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, memory system 100, storage 130, memory die 200, integrated memory assembly 207, and/or control die 211.

Figure 3A:
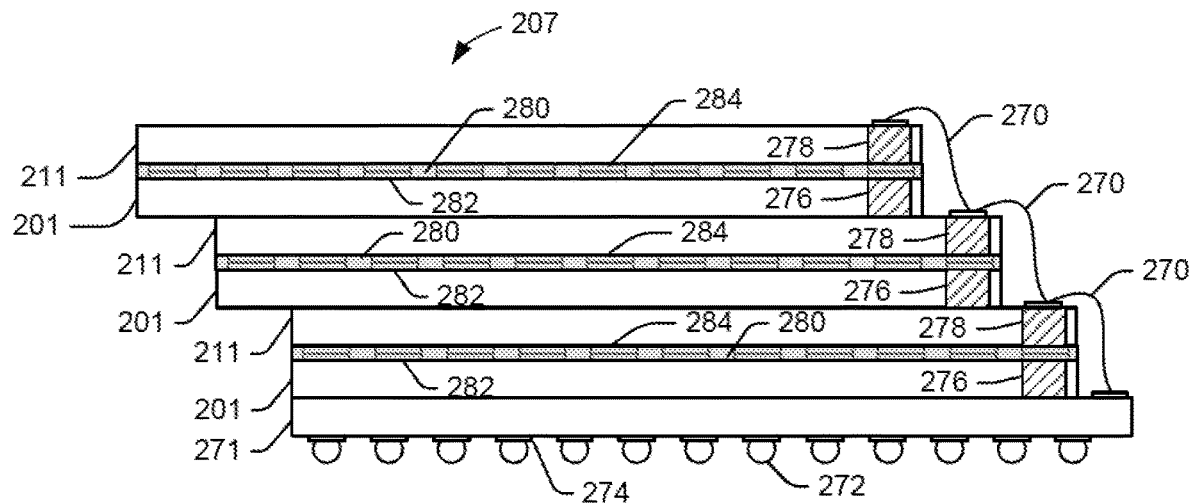
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
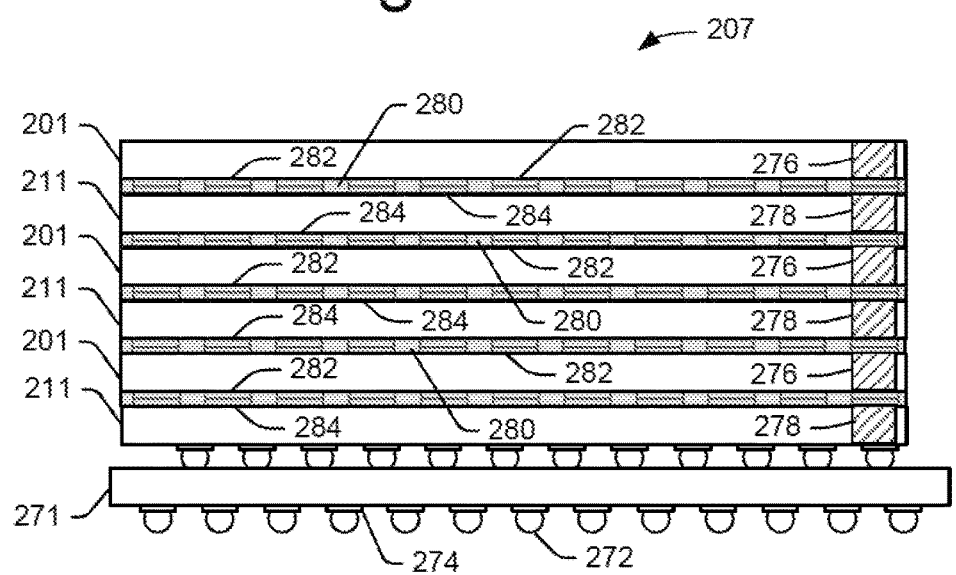

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm.

Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

FIG. 3C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier. The following will discuss use of the sense amplifier 325 to sense a condition (e.g., data state) of a memory cell.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the program verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include three latches (ADL, BDL, CDL) for each sense amplifier 325 in this example. More or fewer than three latches may be included in the data latches 340. In one embodiment, for programming each data latch 340 is used to store one bit to be stored into a memory cell and for reading each data latch 340 is used to store one bit read from a memory cell. In a three bit per memory cell embodiment, ADL stores a bit for a lower page of data, BDL stores a bit for a middle page of data, CDL stores a bit for an upper page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 4:
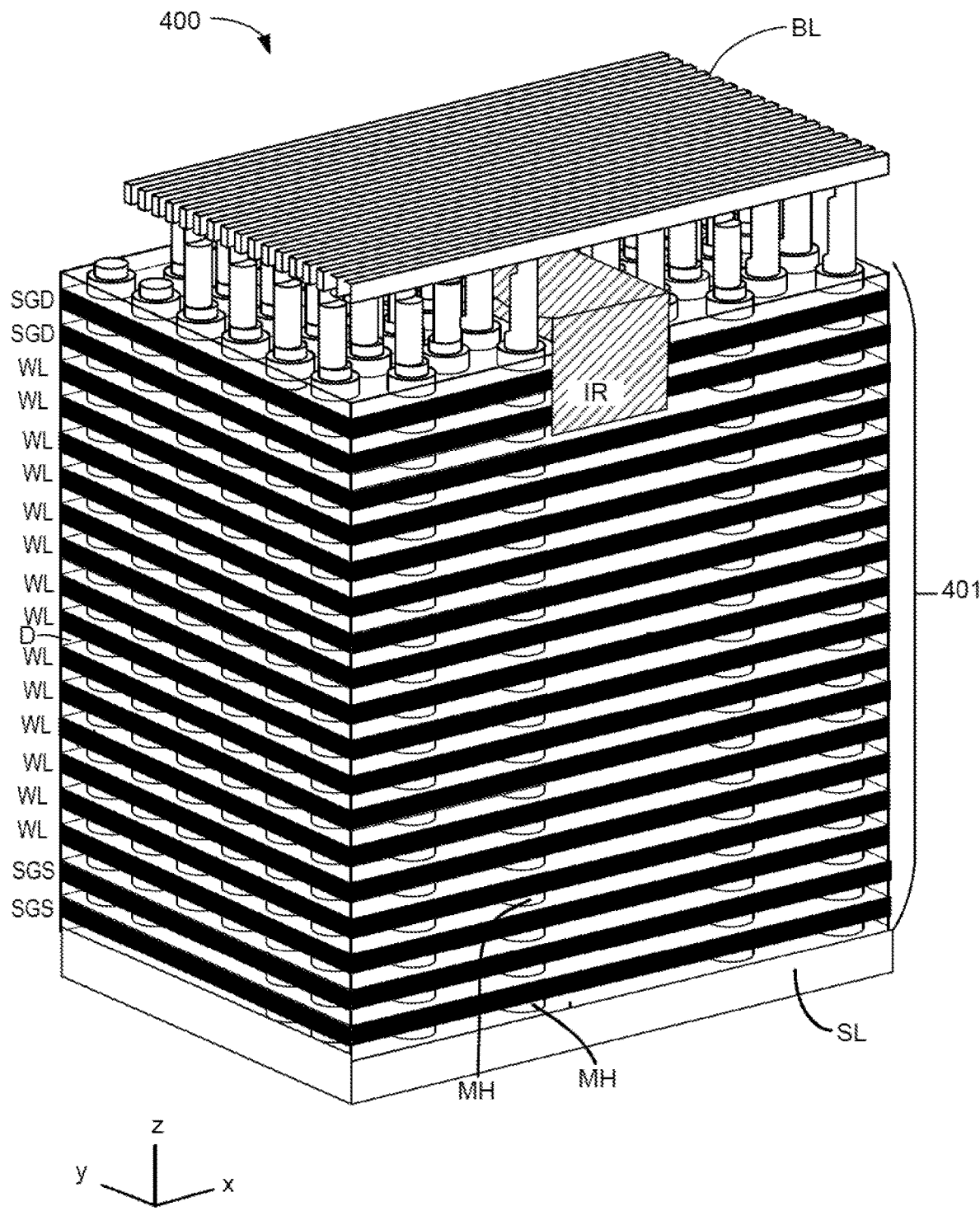
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D. The conductive layers are labeled as one of: SGD, WL, or SGS. An SGD conductive layer serves as drain side select lines. A WL conductive layer serves as a word line. An SGS conductive layer serves as a source side select line. The numbers of each of these conductive layers is limited for ease of illustration. The number of alternating dielectric layers and conductive layers can vary based on specific implementation requirements. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

In one embodiment the block is operated as a number of "sub-blocks." Each of these "sub-blocks" has many NAND strings. In an embodiment, an isolation region (IR) divides the SGD layers into multiple SGD select lines, each of which is used to select a sub-block (e.g., set of NAND strings). FIG. 4 depicts an example having one IR region and thereby two strings. However, there may be more than one IR region and thereby more than two sub-blocks. Optionally, the IR region can extend down through all of the alternating dielectric layers and conductive layers.

FIG. 4A is a block diagram explaining one example organization of memory structure 202, which is divided into two planes 403-A and 403-B. Each plane 403 is then divided into M physical blocks. In one example, each plane has about 2000 physical blocks (or more briefly "blocks"). However, different numbers of blocks and planes can also be used. In one "full-block" embodiment, a block of memory cells is a unit of erase. That is, all memory cells of a block are erased together. In a "sub-block mode" embodiment, blocks are divided into sub-blocks and the sub-blocks are the unit of erase. In an embodiment, a block contains a number of word lines with each sub-block containing a unique set of the data word lines. In an embodiment, each plane 403-A, 403-B has a set of bit lines that extend across all of the blocks in that plane. In an embodiment, one block per plane is selected at a time. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403-A, 403-B more or fewer than two planes can be implemented. In some embodiments, memory structure 202 includes four planes. In some embodiments, memory structure 202 includes eight planes. In some embodiments, programming can be performed in parallel in a first selected block in plane 403-A and a second selected block in plane 403-B.

FIGS. 4B1-4F depict an example three dimensional ("3D") NAND structure that corresponds to the structure of FIG. 4 and can be used to implement memory structure 202 of FIGS. 2A and 2B. FIG. 4B1 is a block diagram depicting a top view of a portion of block of memory cells showing an array region 411 and an embodiment of a dummy array region 412. FIG. 4B1 depicts a plurality of circles that represent the vertical columns (or memory holes). Some of the memory holes are used to implement NAND strings that are eligible to store data. Some of the memory holes do not contain NAND strings that are eligible to store data and are referred to as "dummy memory holes" or "dummy NAND strings." The memory holes in memory array region 411 used to implement NAND strings that are eligible to store data. The dummy memory holes are in dummy array region 412. Note that the block contains many more memory holes that contain NAND strings that are eligible to store data than dummy memory holes.

Each of the vertical columns (memory holes) in memory array region 411 include multiple select transistors (also referred to as a select gate or selection gate) and multiple memory cells. In one embodiment, each vertical column implements a NAND string. For example, FIG. 4B1 depicts vertical columns 422, 432, 442, and 452. Vertical column 422 implements NAND string 482. Vertical column 432 implements NAND string 484. Vertical column 442 implements NAND string 486. Vertical column 452 implements NAND string 488. More details of the vertical columns are provided below. Since the physical block depicted in FIG. 4B1 extends in the direction of arrow 433, the physical block includes more vertical columns than depicted in FIG. 4B. The vertical columns (dummy memory holes) in dummy array region 412 may be fabricated in a similar manner as the vertical columns in memory array region 411.

FIG. 4B1 also depicts a first set of bit lines 415 and a second set of dummy bit lines 417. The first set of bit lines 415 are associated with the NAND strings that are eligible to store data. The second set of dummy bit lines 417 are associated with the dummy memory holes in dummy array region 412. Each of the circles representing vertical columns has an "x" to indicate its connection to one bit line. The bit lines 415 and dummy bit lines 417 may also extend over other blocks in the plane.

The block depicted in FIG. 4B1 includes a set of isolation regions 402, 404, 406, 408, and 410, which are formed of SiO$_2$; however, other dielectric materials can also be used. Isolation regions 402, 404, 406, 408, and 410 serve to divide the top layers of the lock into four regions; for example, the top layer depicted in FIG. 4B1 is divided into regions 420, 430, 440, and 450, which are referred to herein as "sub-blocks." Each sub-block contains a large number of NAND strings. In one embodiment, isolation regions 402 and 410 separate the physical block 407 from adjacent physical blocks. Thus, isolation regions 402 and 410 may extend down to the substrate. In one embodiment, the isolation regions 404, 406, and 408 only divide the layers used to implement select gates so that NAND strings in different sub-blocks can be independently selected. Referring back to FIG. 4, the IR region may correspond to any of isolation regions 404, 406, or 408. In one example implementation, a bit line 415 only connects to one vertical column/NAND string in each of regions (sub-blocks) 420, 430, 440, and 450. Similarly, a dummy bit line 417 only connects to one dummy memory hole in each of regions (sub-blocks) 420, 430, 440, and 450. In that implementation, each block has sixteen rows of active columns and each bit line 415 connects to four NAND strings in each block. In one embodiment, all of the four vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B1 shows each region (420, 430, 440, 450) having four rows of vertical columns, four regions (420, 430, 440, 450) and sixteen rows of vertical columns in a block, those exact numbers are an example implementation. Other embodiments may include more or fewer regions (420, 430, 440, 450) per block, more or fewer rows of vertical columns per region and more or fewer rows of vertical columns per block. FIG. 4B1 also shows the vertical columns being staggered. In other embodiments, different patterns of staggering can be used. In some embodiments, the vertical columns are not staggered.

Because the dummy bit lines 417 are connected to the dummy memory holes in dummy array region 412 the memory system is able to drive a voltage to the dummy memory holes in dummy array region 412. In an embodiment, the memory system drives a voltage onto one or more of the dummy bit lines 417 to provide the voltage to one or more of the dummy memory holes in dummy array region 412. The dummy bit lines 417 also allow sensing of the dummy memory holes in dummy array region 412. In an embodiment, the memory system senses a signal on one or more of the dummy bit lines 417 to sense one or more of the dummy memory holes in dummy array region 412. The sensing results may be used to determine whether there is a defect associated with the dummy memory holes.

In an embodiment, two or more of the dummy bit lines 417 are electrically connected together, which reduces the amount of circuitry needed to provide a voltage to dummy memory holes and/or sense dummy memory holes. In an embodiment, all of the dummy bit lines 417 are electrically connected together. FIG. 4B2 is a block diagram depicting a top view of a portion of block of memory cells showing a memory array region 411 and an embodiment of a dummy array region 412 in which dummy bit lines are electrically connected to each other. FIG. 4B2 depicts an embodiment in which the dummy bit lines 417 are electrically connected by conductive line 418. Voltage driver 413 may be used to drive a voltage onto the electrically connected dummy bit lines 417. Sense node 414 may be used to sense a signal on the electrically connected dummy bit lines 417. The sense node 414 and voltage driver 413 may be implemented by a read/write circuit 225 or sense amplifier 325 similar to those used for NAND strings eligible to store data. However, the sense node 414 and voltage driver 413 could be implemented with other circuitry. Because the dummy bit lines 417 are electrically connected together only a small amount of circuitry is needed to operate the dummy bit lines 417.

Figure 4C:
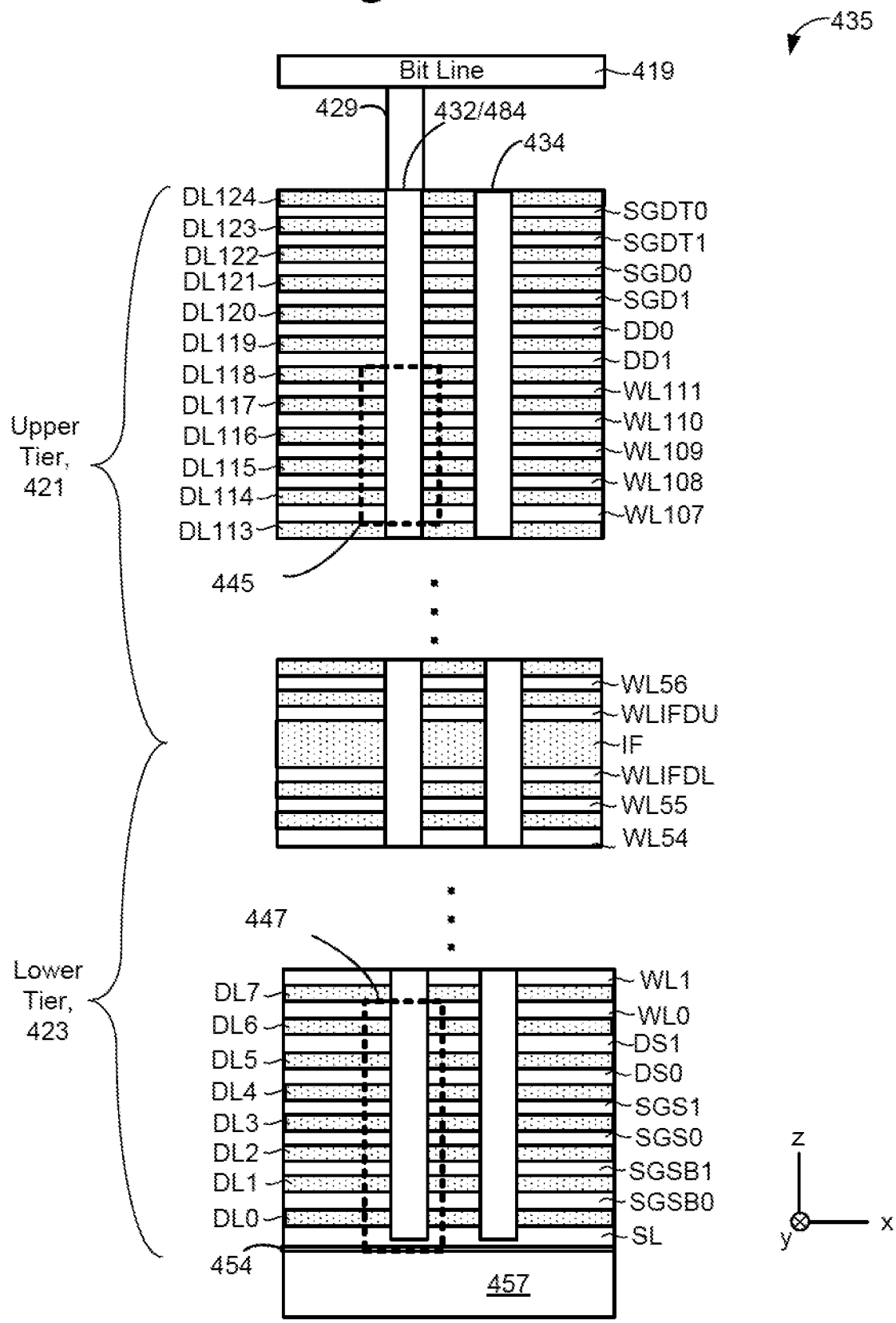
FIG. 4C depicts an example of a stack showing a cross-sectional view along line AA of FIG. 4B1.

FIG. 4C depicts an example of a stack 435 showing a cross-sectional view along line AA of FIG. 4B1. Therefore, FIG. 4C is depicting a slice in memory array region 411. Note that the dummy memory holes in dummy array region 412 may have substantially the same structure for at least a portion of the memory hole depicted in FIG. 4C. However, in an embodiment, the dummy memory holes are not electrically connected to the source line. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Six dummy word line layers DD0, DD1, WLIFDU, WLIDDL, DS1, and DS0 are provided, in addition to the data word line layers WL0-WL111. There may be more or fewer than 112 data word line layers and more or fewer than six dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 419 is also depicted. Note that NAND string 484 is connected to the bit line 419. NAND string 484 has a source-end at a bottom of the stack and a drain-end at a top of the stack. The source-end is connected to the source line SL. A conductive via 429 (also referred to as a bit line contact) connects the drain-end of NAND string 484 to the bit line 419.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. The term "dummy memory cell" refers to a memory cell on a NAND string in the memory array region 411. A dummy memory cell does not store and is not eligible to store host data (data provided from the host, such as data from a user of the host), while a data memory cell is eligible to store host data. In some embodiments, data memory cells and dummy memory cells may have the same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

In some embodiments, the stack 435 is divided into two or more tiers. A two or other multi-tier stack can be used to form a relatively tall stack while maintaining a relatively narrow memory hole width (or diameter). After the layers of the lower tier 423 are formed, memory hole portions are formed in the lower tier 423. Subsequently, after the layers of the upper tier 421 are formed, memory hole portions are formed in the upper tier 421, aligned with the memory hole portions in the lower tier 423 to form continuous memory holes from the bottom to the top of the stack. The resulting memory hole is narrower than would be the case if the hole were etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines. In some embodiments, the tiers are erased independent of one another. Hence, data may be maintained in the upper tier after the lower tiers is erased. Likewise, data may be maintained in the lower tier after the upper tier is erased.

Figure 4D:
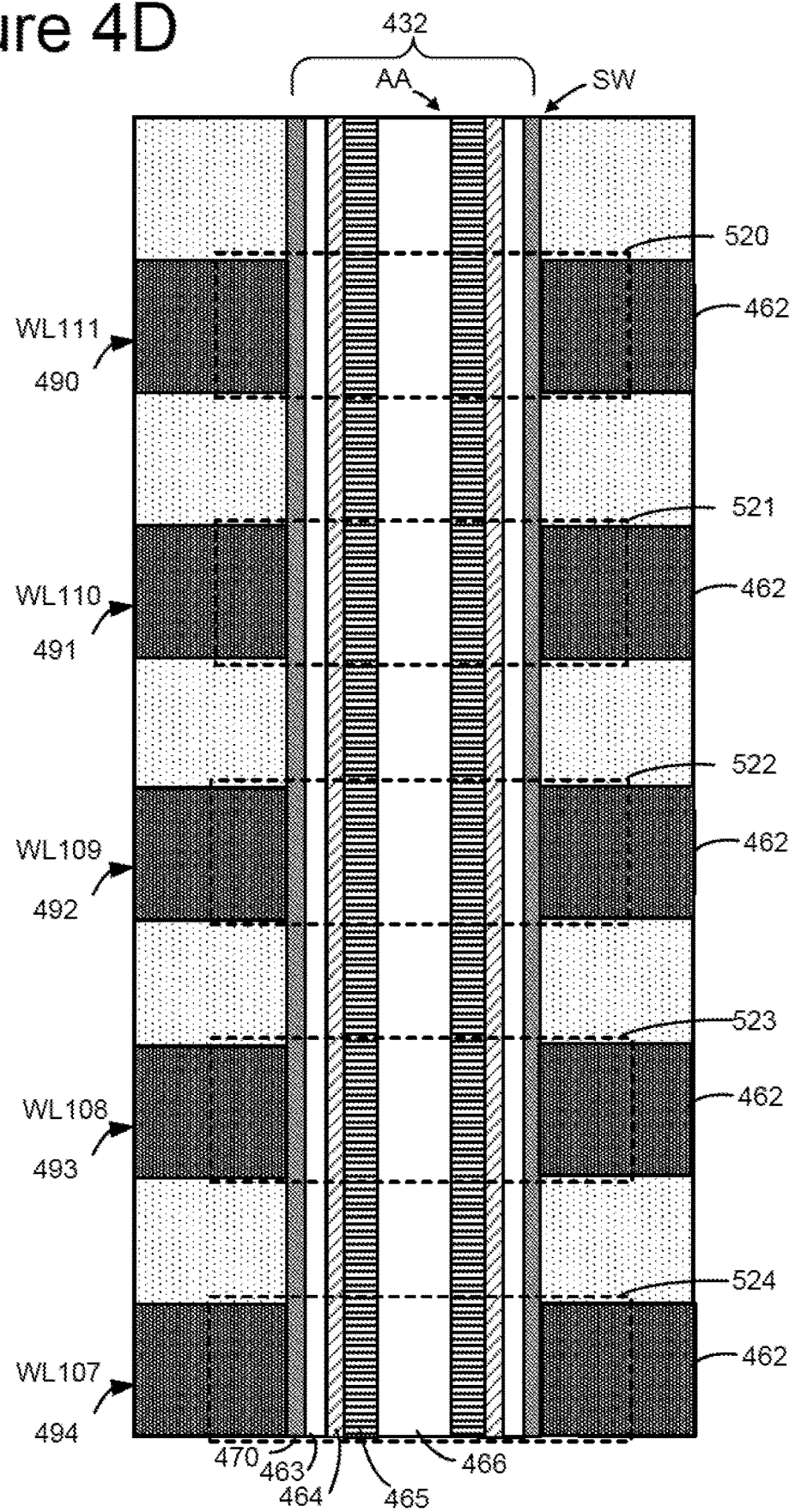
FIG. 4D depicts a view of the region 445 of FIG. 4C.

FIG. 4D depicts a view of the region 445 of FIG. 4C. FIG. 4D will be discussed with reference to a NAND string in the memory array region 411. However, an embodiment of a dummy NAND string in dummy array region 412 also has the structure depicted in FIG. 4D. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

FIG. 4E1 depicts a view of the region 447 of FIG. 4C. The structure in FIG. 4E1 is for a NAND string in the memory array region 411. Source side select transistors 570, 571, 572, and 573 are indicated by the dashed lines. The layers 470, 463, 464, 465 along the sidewall (SW) of the memory hole 432 are depicted (see FIG. 4D). A select line layer can be formed from the conductive metal 462 (see FIG. 4D) such as Tungsten as a control gate to the select transistors SGSB0, SGSB1, SGS0, and SGS1, respectively. For example, control gates 590, 591, 592, and 593 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

FIG. 4E1 shows a source line (SL) 542. The source line 542 is formed from a conductive material such as tungsten or silicon. The bottom portion of the channel 465 is in direct physical and electrical contact with the source line (SL). Above the source line 542 is an upper DSC (direct source contact) polysilicon region 546. Below the source line 542 is a lower DSC polysilicon region 540.

Unlike the NAND string in FIG. 4E1 in which the channel 465 is directly connected to the source line, the channel 465 of an embodiment of a dummy NAND string is separated from the source line by an insulator. Therefore, the channel 465 of this embodiment of the dummy NAND string is floating at the source end. FIG. 4E2 depicts the source end of an embodiment of a dummy memory hole. Note that the channel 465 is not in direct electrical contact with the source line (SL) due to the presence of layers 464, 463, and 470. Therefore, the channel 465 is floating at the source end of the memory hole.

Figure 4F:
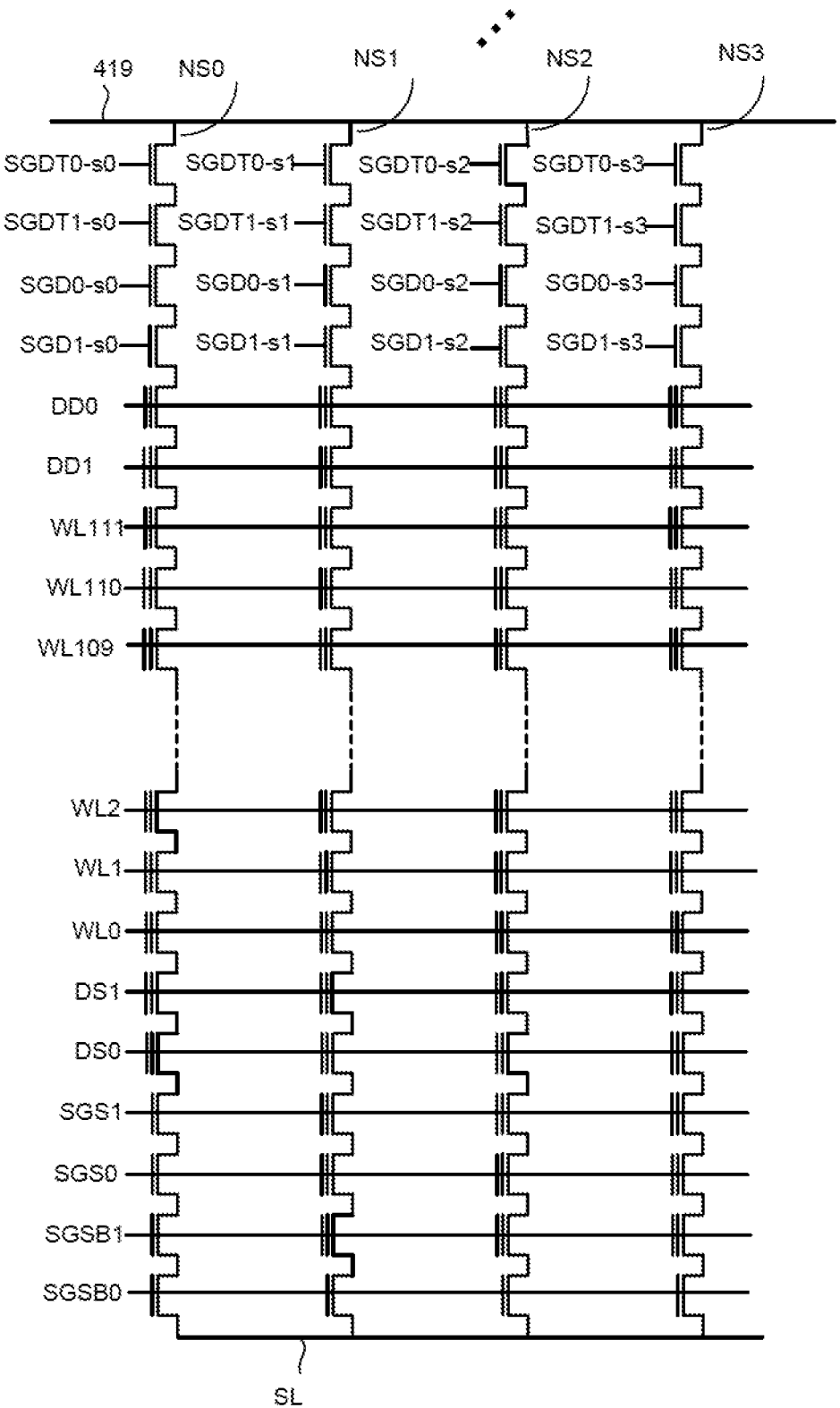
FIG. 4F is a schematic diagram of a portion of one embodiment of a block, depicting several NAND strings.

FIG. 4F is a schematic diagram of a portion of the memory array 202. FIG. 4F shows physical data word lines WL0-WL111 running across the entire block. The structure of FIG. 4G corresponds to a portion 407 in Block 2 of FIG. 4A, including bit line 419. Within the physical block, in one embodiment, each bit line is connected to five NAND strings. Thus, FIG. 4F shows bit line 419 connected to NAND string NS0, NAND string NS1, NAND string NS2, and NAND string NS3.

In one embodiment, there are four sets of drain side select lines in the block. For example, the set of drain side select lines connected to NS0 include SGDT0-s0, SGDT1-s0, SGD0-s0, and SGD1-s0. The set of drain side select lines connected to NS1 include SGDT0-s1, SGDT1-s1, SGD0-s1, and SGD1-s1. The set of drain side select lines connected to NS2 include SGDT0-s2, SGDT1-s2, SGD0-s2, and SGD1-s2. The set of drain side select lines connected to NS3 include SGDT0-s3, SGDT1-s3, SGD0-s3, and SGD1-s3. Herein the term "SGD" may be used as a general term to refer to any one or more of the lines in a set of drain side select lines. In an embodiment, each line in a given set may be operated independent from the other lines in that set to allow for different voltages to the gates of the four drain side select transistors on the NAND string. Moreover, each set of drain side select lines can be selected independent of the other sets. Each set drain side select lines connects to a group of NAND strings in the block. Only one NAND string of each group is depicted in FIG. 4F. These four sets of drain side select lines correspond to four sub-blocks. A first sub-block corresponds to those vertical NAND strings controlled by SGDT0-s0, SGDT1-s0, SGD0-s0, and SGD1-s0. A second sub-block corresponds to those vertical NAND strings controlled by SGDT0-s1, SGDT1-s1, SGD0-s1, and SGD1-s1. A third sub-block corresponds to those vertical NAND strings controlled by SGDT0-s2, SGDT1-s2, SGD0-s2, and SGD1-s2. A fourth sub-block corresponds to those vertical NAND strings controlled by SGDT0-s3, SGDT1-s3, SGD0-s3, and SGD1-s3. As noted, FIG. 4F only shows the NAND strings connected to bit line 419. However, a full schematic of the block would show every bit line and five vertical NAND strings connected to each bit line.

Although the example memories of FIGS. 4-4F are three dimensional memory structure that includes vertical NAND strings with charge-trapping material, other 3D memory structures can also be used with the technology described herein.

Figure 5:
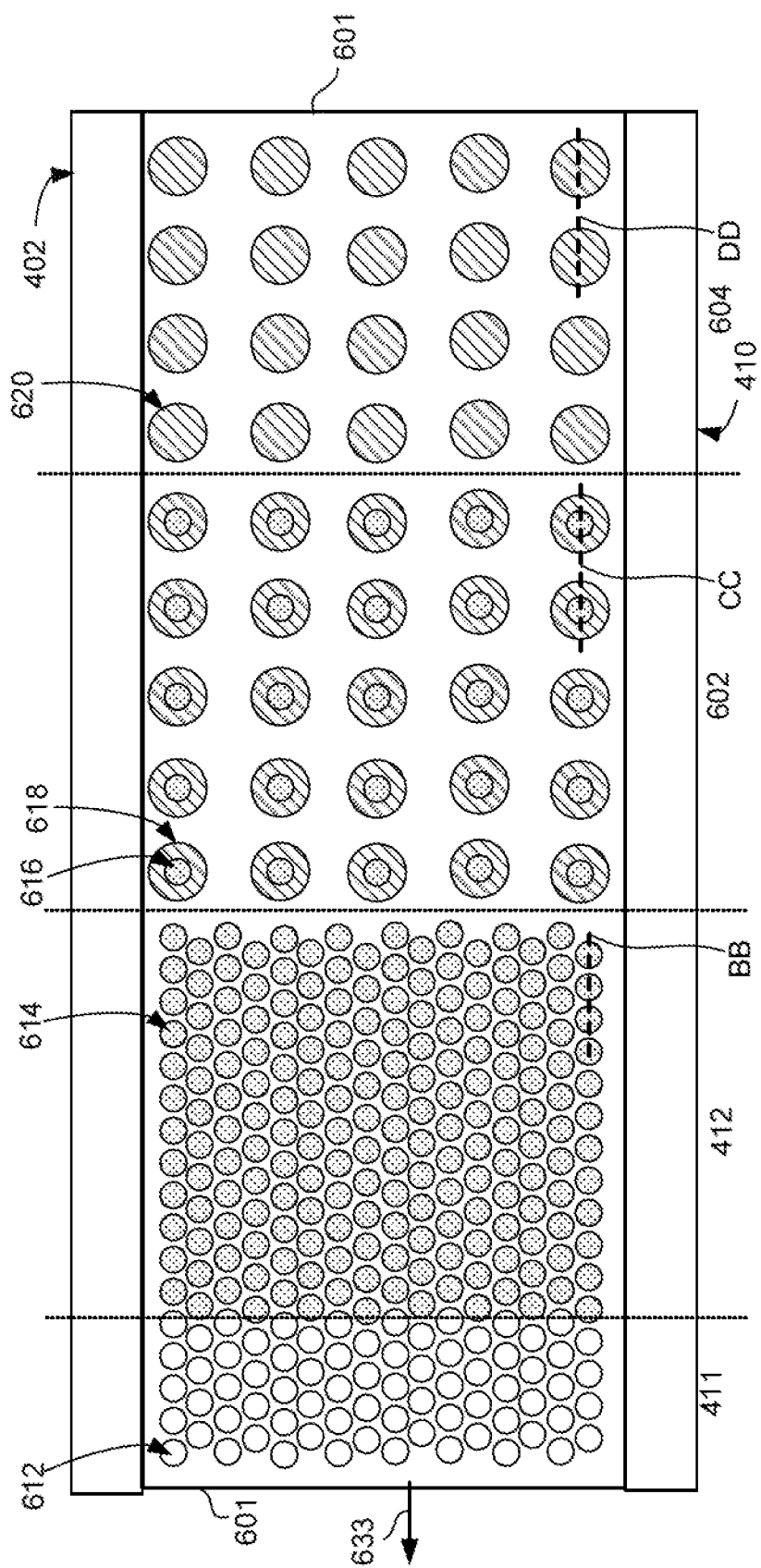
FIG. 5 is a diagram depicting a one layer of a portion of a block in a 3D NAND memory structure.

FIG. 5 is a diagram depicting a one layer of a portion of a block in a 3D NAND memory structure. The layer is a word line layer 601 in the 3D NAND structure. In particular, this may be one of the word line layers in an upper tier. FIG. 5 corresponds to an edge of the block and shows a small portion of the memory array region 411, the dummy array region 412, a DMH2 region 602 and an SGD region 604. There may be some additional regions referred to as a staircase structure (to the right of SGD region 604) that are not depicted in FIG. 5. The block is bounded by ST structures 402, 410. Referring back to FIG. 4B1, SGD layers may have isolation regions 404, 406, 408 within the block to divide the SGD layer into separate SGD select lines in order to operate the block as sub-blocks. However, the isolation regions 404, 406, 408 are not depicted in FIG. 5, as FIG. 5 shows a word line layer 601.

One of the memory NAND strings (or regular memory hole) 612 is referenced in the memory array region 411. The memory array region 411 extends in the y-direction as indicated by arrow 633. One of the dummy NAND strings (or dummy memory hole) 614 is referenced in the dummy array region 412. The dummy memory holes in dummy array region 412 are shaded to highlight the dummy memory holes; however, as noted above, the dummy memory holes may be fabricated to contain the same memory cell films as the memory holes in the memory array region 411. In the layer depicted in FIG. 5, the dummy memory holes in dummy array region 412 have substantially the same diameter as the memory holes in memory array region 411. However, the diameter of a memory hole typically may be layer dependent, as will be discussed below.

In the word line layer 601 depicted in FIG. 5, the dummy memory holes in DMH2 region 602 have a substantially larger diameter than the dummy memory holes in dummy array region 412. In the layer depicted in FIG. 5, the dummy memory holes in the DMH2 region 602 have an inner film region 616 that may be formed from the same memory cell films as is used for the dummy memory holes 614 and regular memory holes 612. However, the portions of the dummy memory holes in DMH2 region 602 at different word line layers do not necessarily have all of the memory cell films. The dummy memory holes in DMH2 region 602 also have an outer insulting region 618 that surrounds the inner film region 616. The outer insulting region 618 provides electrical isolation between the inner film region 616 and the word line layer 601.

In the word line layer 601 depicted in FIG. 5, the SGD holes 620 in SGD region 604 has approximately the same diameter as the dummy memory holes in DMH2 region 602. The SGD holes 620 in SGD region 604 are filled with an insulator such as silicon oxide.

The bit lines are not depicted in FIG. 5. However, bit lines extend in the x-direction above the highest layer in the stack over at least the memory array region 411 and the dummy array region 412. In an embodiment, regular bit lines extend the x-direction over the memory array region 411 and dummy bit lines extend in the x-direction over the dummy array region 412. In a further embodiment, dummy bit lines also extend in the x-direction over DMH2 region 602 and contact the inner film regions 616.

Figure 6A:
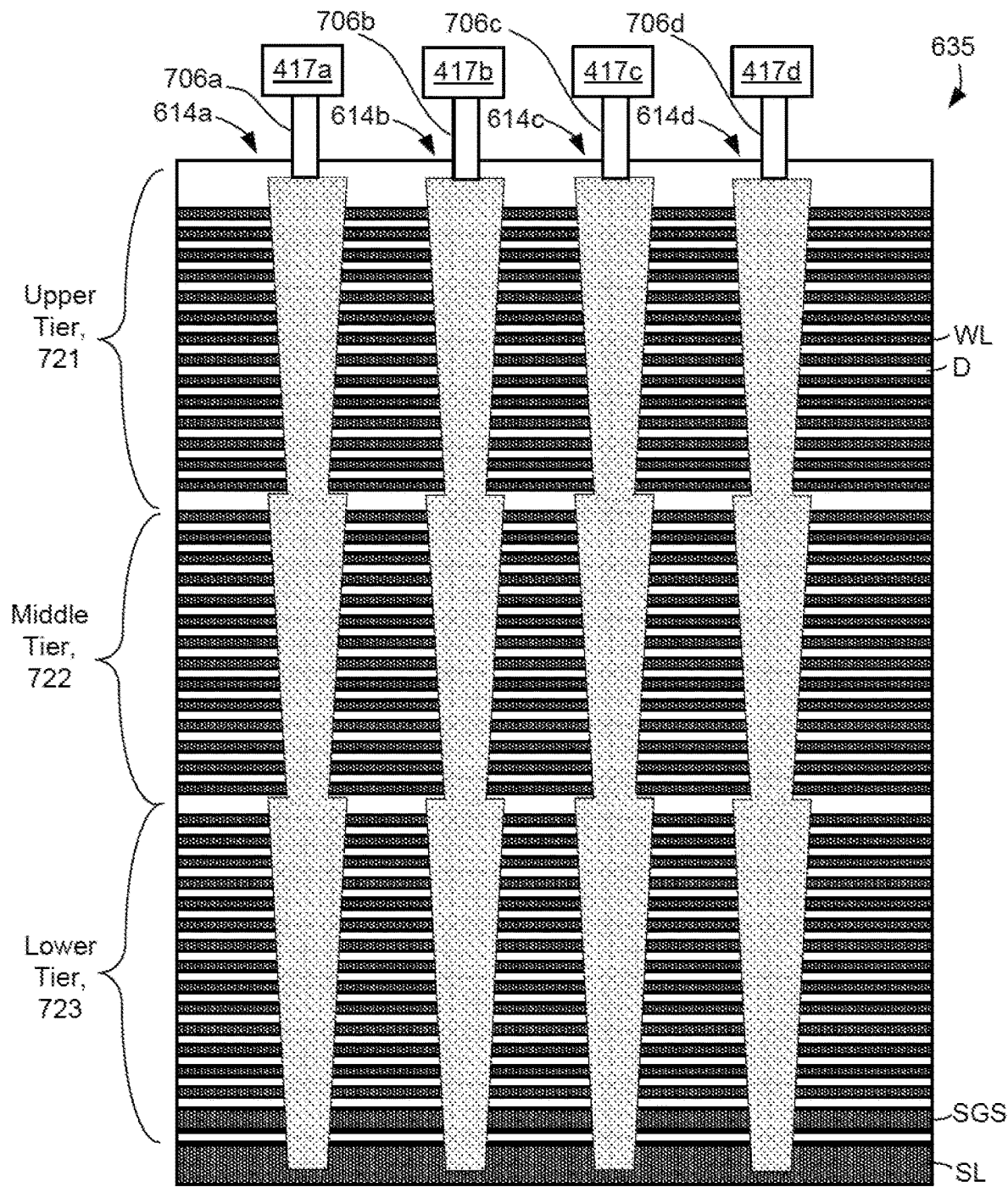
FIG. 6A is a stack showing a cross-sectional view along line BB of FIG. 5.

FIG. 6A is a stack 635 showing a cross-sectional view along line BB of FIG. 5. Therefore, FIG. 6A is depicting a slice in dummy array region 412. In general, the stack has one or more tiers. In this example, the stack 635 has an upper tier 721, a middle tier 722, and a lower tier 723. The diameter of the memory holes may increase going upwards in a tier. Four dummy memory holes (or dummy NAND strings) 614a, 614b, 614c, 614d are depicted. Each dummy NAND string is connected to a dummy bit line. Dummy NAND string 614a is connected to dummy bit line 417a by way of bit line contact 706a; dummy NAND string 614b is connected to dummy bit line 417b by way of bit line contact 706b; dummy NAND string 614c is connected to dummy bit line 417c by way of bit line contact 706c; and dummy NAND string 614d is connected to dummy bit line 417d by way of bit line contact 706. Each of the dummy NAND strings 614 may have memory cell films similar to the films 470, 463, 464, 465 shown in FIGS. 4D and 4E2. Note that memory cell films 470, 463, 464, 465 are just one example and that NAND strings can be formed with other memory cell film layers.

The stack 635 has alternating conductive and insulating layers. Many of the conductive layers are word line layers. One of the word line layers (WL) and one of the insulating (or dielectric) layers (D) are labeled. A source line (SL) is at the bottom of the stack 635, just below an SGS layer. In an embodiment, the dummy NAND strings 614 are floating at the source end in that the dummy NAND strings 614 are electrically isolated from the source line (SL). However, the channels (e.g., channel 465, see FIGS. 4D and 4E2) are electrically connected to the dummy bit lines 417 by way of the bit line contacts 706. In an embodiment, the dummy bit lines 417a, 417b, 417c, and 417d are electrically connected (along with other dummy bit lines). In an embodiment, the memory system applies a first voltage to the dummy bit lines 417 while applying a second voltage to one or more of the conductive layers in the stack 635 in order to stress the dummy memory holes 614. In an embodiment, the memory system senses a signal on dummy bit lines 417 while applying a voltage to one or more of the conductive layers in the stack 635 in order to determine whether there is a defect (e.g., conductive layer to dummy memory hole 614 short). For example, this could be a leakage current test.

FIG. 6B1 is a stack 635 showing a cross-sectional view along line CC of FIG. 5. Therefore, FIG. 6B1 is depicting a slice in the DMH2 region 602. The stack 635 in FIG. 6B1 shows the alternating conductive and insulating layers in the upper tier 721, middle tier 722, and lower tier 723. The diameter of the DMH2 memory holes may increase going upwards in a tier. Two DMH2 memory holes 724a, 724b are depicted. Each DMH2 memory hole has an inner film region 616 and an outer insulting region 618. The inner film region 616 has a larger diameter in the upper tier 721 than in the middle tier 722 and lower tier 723 in this example. The portion 725 of the inner film region 616 in the upper tier 721 may contain the same memory cell films as are present in the dummy NAND strings and regular NAND strings. The portion 727 of the inner film region 616 in the lower two tiers 722, 723 contains fewer than all of the memory cell films. However, at least one of the memory cell film layer may be present in the middle tier 722 and lower tier 723. Moreover memory cell film layer 727 contains a conductive film in an embodiment. Therefore, there is a possibility for an electrical short between a conductive layer and the inner film region 616. The outer insulting region 618 provides a considerable amount of protection to prevent a conductive layer (e.g., word line) from coming into electrical contact with a memory cell film layer (e.g., channel 465). However, there is still some chance of an electrical short between a conductive layer (e.g., word line) and a conductive region in the inner film region 616 (regardless of the tier).

In an embodiment, the DMH2 memory holes 724 are not connected to any bit lines. However, in one embodiment, the DMH2 memory holes 724 are connected to dummy bit lines. FIG. 6B2 is a stack 635 showing a cross-sectional view of an embodiment along line CC of FIG. 5. Therefore, FIG. 6B2 is depicting a slice in DMH2 region 602. The stack 635 in FIG. 6B2 shows the alternating conductive and insulating layers in the upper tier 721, middle tier 722, and lower tier 723. Two DMH2 memory holes 724c, 724d are depicted. Each DMH2 memory hole has an inner film region 616 and an outer insulting region 618. The inner film region 616 of DMH2 memory hole 724c is connected to DMH2 bit line 732c by way of bit line contact 734c. The inner film region 616 of DMH2 memory hole 724d is connected to DMH2 bit line 732d by way of bit line contact 734d. Optionally, the DMH2 bit lines 732c, 732d may be electrically connected to each other (and to other dummy bit lines connected to other DMH2 memory holes 724). In an embodiment, the memory system applies a first voltage to the DMH2 bit lines 732 while applying a second voltage to one or more of the conductive layers in the stack 635 in order to stress the DMH2 memory holes 724. In an embodiment, the memory system senses a signal on DMH2 bit lines 732 while applying a voltage to one or more of the conductive layers in the stack 635 in order to determine whether there is a defect (e.g., conductive layer to DMH2 memory hole 724 short).

Figure 6C:
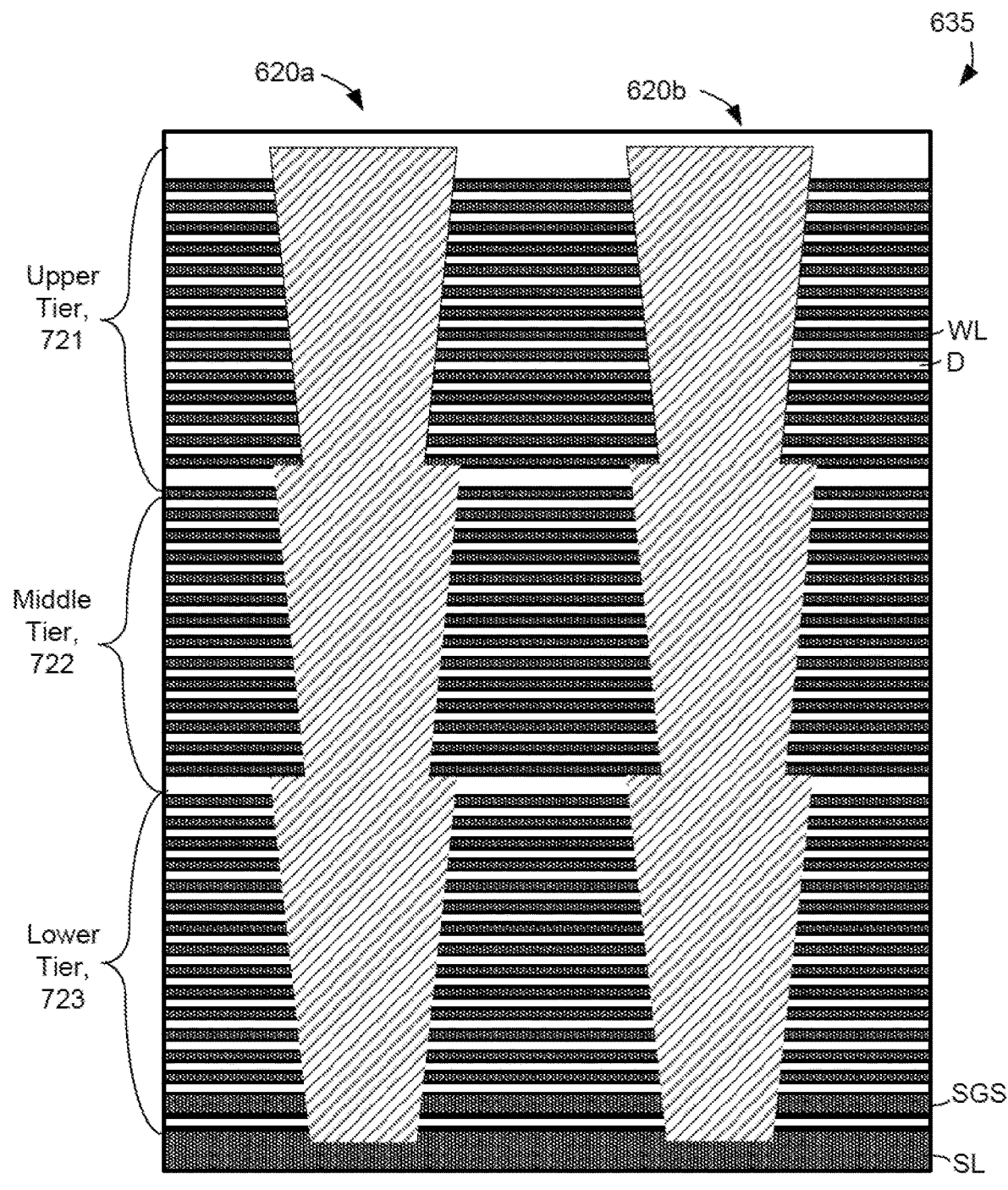
FIG. 6C is a stack showing a cross-sectional view along line DD of FIG. 5.

FIG. 6C is a stack 635 showing a cross-sectional view along line DD of FIG. 5. Therefore, FIG. 6C is depicting a slice in SGD region 604. The stack 635 in FIG. 6C shows the alternating conductive and insulating layers in the upper tier 721, middle tier 722, and lower tier 723. The diameter of the SGD holes may increase going upwards in a tier. Two SGD holes 620a, 620b are depicted. Each SGD hole 620 is filled with an insulator such as silicon oxide. Because the SGD holes 620 are filled with an insulator there is not a risk of an electrical short involving the SGD holes 620.

Figure 7:
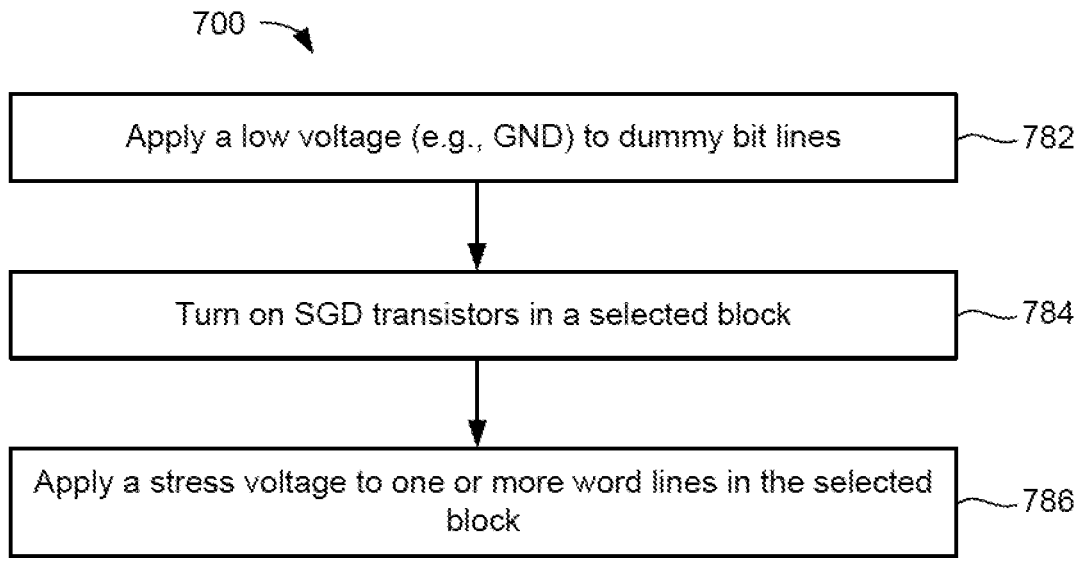
FIG. 7 is a flowchart of one embodiment of a process of stressing dummy memory holes.

FIG. 7 is a flowchart of one embodiment of a process 700 of stressing a dummy memory hole. Process 700 may be performed, for example, during die sort. However, optionally, the process 700 may be performed in the field. In one embodiment, process 700 is used to stress dummy NAND strings in the dummy array region 412. In one embodiment, process 700 is used to stress DMH2 memory holes 724 in the DMH2 region 602. Step 782 includes applying a low voltage (e.g., 0V) to the dummy bit lines. In one embodiment, the low voltage is applied to the dummy bit lines 417 that are connected to the dummy NAND strings 614. In one embodiment, the low voltage is applied to the DMH2 bit lines 732 that are connected to the DMH2 memory holes 724. In an embodiment, the dummy bit lines are electrically connected with each other such that a single voltage driver may be used to provide the voltage to all of the dummy bit lines.

Step 784 includes turning on SGD transistors in a selected block. Step 786 includes applying a stress voltage to one or more word lines in the selected block. The stress voltage may be a relatively high voltage such as, for example, 20V. The stress voltage is applied to at least one word line and may be applied to up to all word lines in the selected block.

Figure 8:
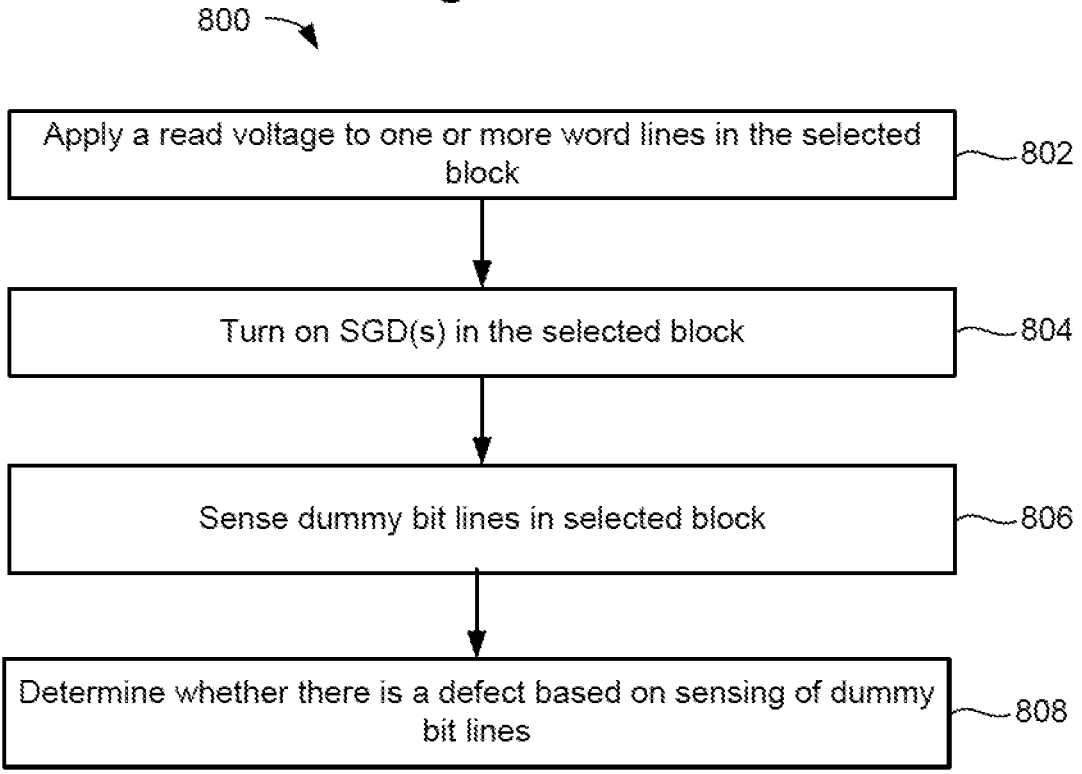
FIG. 8 is a flowchart of one embodiment of a process of testing dummy memory holes for a defect.

FIG. 8 is a flowchart of one embodiment of a process 800 of testing a dummy memory hole for a defect. Process 800 may be performed soon after performing process 700. However, process 800 is not required to be performed soon after performing process 700. Rather, process 800 may be performed at any time. One option is to perform process 800 to eliminate bad blocks or bad dies. Optionally, the process 800 may be performed in the field. In one embodiment, process 800 is used to test dummy NAND strings in the dummy array region 412 for a defect. In one embodiment, process 800 is used to test DMH2 memory holes 724 in the DMH2 region 602 for a defect. Step 802 includes applying a read voltage to one or more word lines in the selected block. The read voltage has a suitable magnitude to test for a leakage current between the one or more word lines and the dummy memory holes. The read voltage may have a lower voltage than the stress voltage used in process 700. As an example, the read voltage may be between 5V to 10V; however, the read voltage may be less than 5V or greater than 10V. The read voltage is applied to at least one word line and may be applied to up to all word lines in the selected block.

Step 804 includes turning on SGD transistors in a selected block. Step 806 includes sensing the dummy bit lines. In one embodiment, the dummy bit lines 417 that are connected to the dummy NAND strings 614 are sensed. In one embodiment, the DMH2 bit lines 732 that are connected to the DMH2 memory holes 724 are sensed In an embodiment, the dummy bit lines are electrically connected with each other such that a single sense node may be used to sense all of the dummy bit lines.

Step 808 includes determining whether there is a defect based on sensing the dummy bit lines. This defect may be, for example, a word line to dummy NAND string short, a word line to DMH2 short, but is not limited thereto. Step 808 may include determining whether a leakage current is detected.

In view of the foregoing, an embodiment includes an apparatus comprising a three-dimensional NAND memory structure having a plurality of blocks. Each block comprises a plurality of word line layers, a source line, operational NAND strings each having a NAND channel connected to the source line, and dummy NAND strings each having a conductive channel that is insulated from the source line. The word line layers in a particular block are connected to the operational NAND strings and the dummy NAND strings. The three-dimensional NAND memory structure has bit lines in electrical contact with the conductive channels of the dummy NAND strings. The apparatus further has one or more control circuits in communication with the three-dimensional NAND memory structure. The one or more control circuits are configured to sense one or more signals on the bit lines connected to the conductive channels of the dummy NAND strings. The one or more control circuits are configured to determine whether there is a defect associated with the dummy NAND strings based on the one or more signals.

In a further embodiment, the bit lines in contact with the conductive channels of the dummy NAND strings are electrically connected with each other. The one or more control circuits comprise a sense node configured to sense the one or more signals on the electrically connected bit lines.

In a further embodiment, the one or more control circuits are further configured to apply a voltage to the electrically connected bit lines.

In a further embodiment, the one or more control circuits are further configured to apply a first voltage to one or more of the word line layers in a selected block in the three-dimensional NAND memory structure while applying a second voltage to the electrically connected bit lines in the selected block. The second voltage has a different magnitude than the first voltage.

In a further embodiment, the difference in magnitude between the first voltage and the second voltage is a stress voltage that accelerates defects associated with the dummy NAND strings.

In a further embodiment, the one or more control circuits are further configured to apply a test voltage to one or more of the word line layers in a selected block in the three-dimensional NAND memory structure. The test voltage has a magnitude configured to test for leakage current. The one or more control circuits sense the one or more signals on the electrically connected bit lines in response to applying the test voltage to the one or more of the word line layers.

In a further embodiment, the dummy NAND strings reside in a first region of a particular block having first dummy holes that extend vertically through the plurality of word line layers. Each first dummy hole has approximately a first diameter in a particular word line layer. Each block in the three-dimensional NAND memory structure further comprises a group of second dummy holes in a second region of the particular block that extend vertically through the plurality of word line layers. Each second dummy hole has approximately a second diameter in the particular word line layer that is greater than the first diameter. Each second dummy hole has a conductive region surrounded by an insulator. The apparatus comprises bit lines electrically connected to the conductive region of the respective second dummy holes.

In a further embodiment, the one or more control circuits are further configured to apply a voltage to one or more of the word line layers in a selected block in the three-dimensional NAND memory structure, sense a signal on the bit lines electrically connected to the second dummy holes in response to the voltage applied to the one or more of the word line layers in the selected block, and determine whether there is a defect in the second dummy holes based on the signal on the bit lines electrically connected to the second dummy holes.

In a further embodiment, the bit lines electrically connected to the second dummy holes are electrically connected to each other.

In a further embodiment, the one or more control circuits comprise a sense node configured to sense the signal on the electrically connected bit lines connected to the second dummy holes.

An embodiment includes a method comprising applying a voltage to one or more word lines of a plurality of word lines in a block in a three dimensional NAND memory structure. The plurality of word lines are connected to dummy memory holes in the block. Each dummy memory hole comprises a conductive memory cell film that extends through the word lines in the block. The conductive memory cell film of each dummy memory hole electrically connected to electrically connected dummy bit lines. The method comprises sensing a signal on the electrically dummy bit lines. The method comprises determining whether there is a defect associated with the dummy memory holes based on the sensing of the electrically dummy bit lines.

An embodiment includes a non-volatile storage system. The storage system comprises a three-dimensional NAND memory structure having blocks. Each block comprises alternating conductive layers and insulating layers. Each block comprises memory holes that extend vertically through the alternating conductive and insulating layers. Each memory hole has memory cell film layers including a channel layer. A first group of the memory holes in a first region in a particular block have their respective channel layer in direct electrical contact with a source line of the particular block. A second group of the memory holes in a second region of the particular block have their respective channel layer electrically isolated from the source line of the particular block. The storage system has a plurality of bit lines that extend over the blocks. The storage system has one or more control circuits in communication with the blocks and the bit lines. The one or more control circuits configured to apply a first voltage to at least one conductive layer of the conductive layers in a selected block while applying a second voltage to the bit lines associated with the second group of memory holes. The one or more control circuits configured determine whether there is a defect associated with the second group of the memory holes following applying the first voltage to the at least one conductive layer while applying the second voltage to the bit lines associated with the second group of memory holes.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
a three-dimensional NAND memory structure having a plurality of blocks, each block comprising a plurality of word line layers, a source line, operational NAND strings each having a NAND channel electrically connected to the source line, and dummy NAND strings each having a conductive channel that is insulated from the source line, the word line layers in a particular block connected to the operational NAND strings and the dummy NAND strings, the three-dimensional NAND memory structure having bit lines in electrical contact with the conductive channels of the dummy NAND strings, the dummy NAND strings are not eligible to store data; and
one or more control circuits in communication with the three-dimensional NAND memory structure, the one or more control circuits configured to:
sense one or more signals on the bit lines connected to the conductive channels of the dummy NAND strings; and
determine whether there is an electrical short defect associated with the dummy NAND strings based on the one or more signals.

2. The apparatus of claim 1, wherein:
the bit lines in electrical contact with the conductive channels of the dummy NAND strings are electrically connected with each other; and
the one or more control circuits comprise a sense node configured to sense the one or more signals on the electrically connected bit lines.

3. The apparatus of claim 2, wherein the one or more control circuits are further configured to turn on drain select transistors in a selected block in the three-dimensional NAND memory structure while applying a first voltage to one or more of the word line layers in the selected block and while applying a second voltage to the electrically connected bit lines in the selected block, the second voltage being a different magnitude than the first voltage.

4. The apparatus of claim 3, wherein the difference in magnitude between the first voltage and the second voltage is a stress voltage that accelerates potential electrical short defects associated with the dummy NAND strings.

5. The apparatus of claim 1, wherein:
the one or more control circuits are further configured to turn on drain select transistors in a selected block in the three-dimensional NAND memory structure while applying a test voltage to one or more of the word line layers in the selected block, the test voltage having a magnitude configured to test for leakage current between the conductive channel of any of the dummy NAND strings and any of the one or more of the word line layers to which the test voltage is applied; and
the one or more control circuits sense the one or more signals on the bit lines in electrical contact with the conductive channels of the dummy NAND strings in response to applying the test voltage to the one or more of the word line layers to determine whether there is the electrical short defect associated with the dummy NAND strings.

6. The apparatus of claim 1, wherein:
the dummy NAND strings reside in a first region of a particular block having first dummy holes that extend vertically through the plurality of word line layers, each first dummy hole having approximately a first diameter in a particular word line layer;
each block in the three-dimensional NAND memory structure further comprises a group of second dummy holes in a second region of the particular block that extend vertically through the plurality of word line layers, each second dummy hole having approximately a second diameter in the particular word line layer that is greater than the first diameter, each second dummy hole having a conductive region surrounded by an insulator; and
the apparatus comprises bit lines electrically connected to the conductive region of the respective second dummy holes.

7. The apparatus of claim 6, wherein the one or more control circuits are further configured to:
apply a voltage to one or more of the word line layers in a selected block in the three-dimensional NAND memory structure;
sense a signal on the bit lines electrically connected to the second dummy holes in response to the voltage applied to the one or more of the word line layers in the selected block; and
determine whether there is an electrical short defect in the second dummy holes based on the signal on the bit lines electrically connected to the second dummy holes.

8. The apparatus of claim 7, wherein the bit lines electrically connected to the second dummy holes are electrically connected to each other.

9. The apparatus of claim 8, wherein the one or more control circuits comprise a sense node configured to sense the signal on the electrically connected bit lines connected to the second dummy holes to test for a leakage current indicative of the electrical short defect in the second dummy holes.

10. A method comprising:
applying a voltage to one or more word lines of a plurality of word lines in a block in a three dimensional NAND memory structure, the plurality of word lines connected to dummy memory holes in the block, each dummy memory hole comprises a conductive memory cell film that extends through the word lines in the block, the conductive memory cell film of each dummy memory hole electrically connected to electrically connected dummy bit lines, the dummy memory holes are not eligible to store data;
sensing a signal on the electrically connected dummy bit lines; and
determining whether there is a defect associated with the dummy memory holes based on the sensing of the electrically connected dummy bit lines, wherein the defect includes an electrical short between the conductive memory cell film of any of the dummy memory holes and any of the one or more word lines of the plurality of word lines.

11. The method of claim 10, further comprising applying a stress voltage to at least one word line of the plurality of word lines in the block while applying a voltage lower than the stress voltage to the electrically connected dummy bit lines from a single voltage driver, the stress voltage configured to accelerate a potential electrical short between the conductive memory cell film of any of the dummy memory holes and any of the at least one or more word line of the plurality of word lines.

12. The method of claim 10, wherein sensing the signal on the electrically connected dummy bit lines comprises:
applying a sensing voltage to the electrically connected dummy bit lines from a single voltage driver; and
sensing the signal on the electrically connected dummy bit lines at a single sense node.

13. A non-volatile storage system, the storage system comprising:
a three-dimensional NAND memory structure having blocks, each block comprising:
alternating conductive layers and insulating layers;
memory holes that extend vertically through the alternating conductive and insulating layers, each memory hole having memory cell film layers including a channel layer, wherein a first group of the memory holes in a first region in a particular block have their respective channel layer in direct electrical contact with a source line of the particular block, wherein a second group of the memory holes in a second region of the particular block have their respective channel layer electrically isolated from the source line of the particular block, the second group of the memory holes are not eligible to store data; and
a plurality of bit lines that extend over the blocks; and
one or more control circuits in communication with the blocks and the bit lines, the one or more control circuits configured to:
apply a first voltage to at least one conductive layer of the conductive layers in a selected block while applying a second voltage to the bit lines associated with the second group of memory holes; and
determine whether there is an electrical short defect associated with the second group of the memory holes following applying the first voltage to the at least one conductive layer while applying the second voltage to the bit lines associated with the second group of memory holes.

14. The non-volatile storage system of claim 13, wherein:
the bit lines associated with the second group of memory holes are electrically connected with each other; and
the second voltage is applied to the electrically connected bit lines.

15. The non-volatile storage system of claim 14, wherein:
a difference in magnitude between the first voltage and the second voltage is a stress voltage;
the one or more control circuits are further configured to sense the electrically connected bit lines following applying the first voltage to the at least one conductive layer in the selected block while applying the second voltage to the bit lines associated with the second group of memory holes; and
the determination of whether there is the defect depends on results of sensing the electrically connected bit lines.

16. The non-volatile storage system of claim 13, wherein:
each memory hole has approximately a first diameter in a particular conductive layer;
each block in the three-dimensional NAND memory structure further comprises a group of dummy holes in a third region of the particular block that extend vertically through the alternating conductive layers and insulating layers, each dummy hole having approximately a second diameter in the particular conductive layer that is greater than the first diameter, each dummy hole having at least the channel layer surrounded by an insulator; and the plurality of bit lines include bit lines electrically connected to the channel layer of the dummy holes.

17. The non-volatile storage system of claim 16, wherein the bit lines electrically connected to the channel layer of the dummy holes are electrically connected with each other.

18. The non-volatile storage system of claim 17, wherein the one or more control circuits are further configured to:
apply a stress voltage to one or more conductive layer of the conductive layers in a selected block while applying a second voltage to the bit lines electrically connected to the channel layer of the dummy holes; and
determine whether there is an electrical short defect associated with the dummy holes following applying the stress voltage.

19. The non-volatile storage system of claim 18, wherein the one or more control circuits comprises a sense node connected to the bit lines electrically connected to the channel layer of the dummy holes, the sense node configured to sense the bit lines electrically connected to the channel layer of the dummy holes to determine whether there is a leakage current that indicates the electrical short defect associated with the dummy holes following applying the stress voltage.

20. The apparatus of claim 1, wherein:
two or more of the bit lines in electrical contact with the conductive channels of the dummy NAND strings are electrically connected with each other;
the one or more control circuits are further configured to turn on drain select transistors in a selected block in the three-dimensional NAND memory structure while applying a test voltage to one or more of the word line layers in the selected block, the test voltage having a magnitude configured to test for leakage current indicative of the electrical short defect associated with the dummy NAND strings; and
the one or more control circuits comprise a sense node configured to sense a first signal on the two or more electrically connected bit lines in response to applying the test voltage to the one or more of the word line layers to detect the leakage current indicative of the electrical short defect associated with the dummy NAND strings.

* * * * *